United States Patent
Chaney

(10) Patent No.: US 11,308,672 B2
(45) Date of Patent: Apr. 19, 2022

(54) TELEPRESENCE OF USERS IN INTERACTIVE VIRTUAL SPACES

(71) Applicant: Sony Interactive Entertainment LLC, San Mateo, CA (US)

(72) Inventor: Roxy Chaney, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/929,990

(22) Filed: Jun. 1, 2020

(65) Prior Publication Data
US 2020/0294297 A1 Sep. 17, 2020

Related U.S. Application Data

(63) Continuation of application No. 15/385,515, filed on Dec. 20, 2016, now Pat. No. 10,699,461.

(51) Int. Cl.
*G06T 13/40* (2011.01)
*G09G 5/12* (2006.01)
(Continued)

(52) U.S. Cl.
CPC .............. *G06T 13/40* (2013.01); *G06F 3/011* (2013.01); *G06F 3/017* (2013.01); *G06F 3/0304* (2013.01);
(Continued)

(58) Field of Classification Search
CPC ...... G06F 3/0304; G06F 3/017; G06F 3/1454; G06F 3/04815; G06F 3/011; G06F 3/016;
(Continued)

(56) References Cited

U.S. PATENT DOCUMENTS 10,699,461 B2  6/2020 Chaney
2009/0027337 A1* 1/2009 Hildreth .............. G06F 3/04842
345/158
(Continued)

FOREIGN PATENT DOCUMENTS

WO   WO 2018/118266   6/2018

OTHER PUBLICATIONS

PCT Application PCT/US2017/061167 International Search Report and Written Opinion dated Feb. 1, 2018.
(Continued)

*Primary Examiner* — Daniel Samwel
(74) *Attorney, Agent, or Firm* — Polsinelli LLP

(57) ABSTRACT

A telepresence communication uses information captured by a first capture device about a first user and information captured by a second capture device about a second user to generate a first avatar corresponding to the first user and a second avatar corresponding to the second user. A scene can be rendered locally or by a remote server in which the first avatar and the second avatar are both rendered in a virtual space. The first avatar is rendered to move based on movements made by the first user as captured by the first capture device, and the second avatar is rendered to move based on movements made by the second user as captured by the second capture device. The avatars may be realistic, based on avatar templates, or some combination thereof. The rendered scene may include virtual interactive objects that the avatars can interact with.

19 Claims, 15 Drawing Sheets

(51) Int. Cl.
*G06F 3/14* (2006.01)
*G06F 3/01* (2006.01)
*G06F 3/03* (2006.01)
*H04N 9/31* (2006.01)
*H04N 7/15* (2006.01)
*G09G 5/377* (2006.01)
*G06F 3/04815* (2022.01)

(52) U.S. Cl.
CPC ........ *G06F 3/04815* (2013.01); *G06F 3/1454* (2013.01); *G09G 5/12* (2013.01); *G09G 5/377* (2013.01); *H04N 7/157* (2013.01); *H04N 9/3179* (2013.01); *H04N 9/3194* (2013.01); *G06F 3/016* (2013.01); *G09G 2350/00* (2013.01); *G09G 2354/00* (2013.01); *G09G 2370/02* (2013.01); *G09G 2370/22* (2013.01)

(58) Field of Classification Search
CPC .......... G06T 13/40; G09G 5/12; G09G 5/377; G09G 2354/00; G09G 2370/02; G09G 2370/22; G09G 2350/00; H04N 9/3179; H04N 9/3194; H04N 7/157
See application file for complete search history.

(56) References Cited

U.S. PATENT DOCUMENTS

| | | | |
|---|---|---|---|
| 2009/0172539 A1* | 7/2009 | Bates | G06F 3/011 715/706 |
| 2011/0175810 A1 | 7/2011 | Markovic et al. | |
| 2011/0292181 A1 | 12/2011 | Acharya et al. | |
| 2012/0086783 A1 | 4/2012 | Sareen | |
| 2012/0265518 A1* | 10/2012 | Lauder | G06F 40/51 704/3 |
| 2013/0178960 A1* | 7/2013 | Sheehan | G16H 40/67 700/91 |
| 2013/0336550 A1* | 12/2013 | Kapur | G06K 9/00369 382/128 |
| 2014/0128148 A1 | 5/2014 | Soffin | |
| 2014/0235348 A1* | 8/2014 | Liang | A63B 69/36 463/36 |
| 2014/0348417 A1* | 11/2014 | Moore | A61B 5/1075 382/154 |
| 2015/0130841 A1* | 5/2015 | Kohli | G16H 40/67 345/633 |
| 2015/0244976 A1 | 8/2015 | Chen et al. | |
| 2015/0314449 A1 | 11/2015 | Wang et al. | |
| 2015/0331576 A1 | 11/2015 | Piya et al. | |
| 2016/0035061 A1* | 2/2016 | Gadre | G06T 19/00 345/473 |
| 2016/0171971 A1* | 6/2016 | Suskind | G09B 19/04 704/260 |
| 2018/0174347 A1 | 6/2018 | Chaney | |
| 2020/0294298 A1 | 9/2020 | Chaney | |

OTHER PUBLICATIONS

U.S. Appl. No. 15/385,515 Office Action dated Jul. 26, 2019.
U.S. Appl. No. 15/385,515 Final Office Action dated Apr. 18, 2019.
U.S. Appl. No. 15/385,515 Office Action dated Oct. 2, 2018.
U.S. Appl. No. 15/929,991, Roxy Chaney, Telepresence of Users in Interactive Vitual Spaces, filed Jun. 1, 2020.
PCT Application PCT/US2017/061167 International Preliminary Report on Patentability dated Jun. 25, 2019.
U.S. Appl. No. 15/929,991 Office Action dated Oct. 6, 2020.

* cited by examiner

TELEPRESENCE OF USERS IN INTERACTIVE VIRTUAL SPACES

CROSS-REFERENCE TO RELATED APPLICATIONS

The present application is a continuation and claims the priority benefit of U.S. patent application Ser. No. 15/385,515 filed Dec. 20, 2016, the disclosure of which is incorporated by reference herein.

BACKGROUND OF THE INVENTION

1. Field of the Invention

The present invention generally concerns telepresence technologies. More particularly, the present invention concerns generating three-dimensional avatars of multiple telepresence participants and rendering the avatars in a virtual three-dimensional space.

2. Description of the Related Art

Image capture devices, such as Microsoft Kinect™, use one or more cameras to capture visual data associated with an environment, to recognize people in the environment, and to recognize movements of the people in the environment. Such image capture devices are sometimes used for videoconferences or for video games in which user movements are recognized and used in the course of a game.

Telepresence refers to a set of technologies which allow two or more users to converse or otherwise interact with an effect similar to being in the same room. Telepresence often refers to videoconferencing technologies that transfer audio much like a phone call and that also transfer video of two or more users. More recently, telepresence has grown to encompass other technologies, such as through use of remote-controlled robots that allow a user to explore a location remotely as if they were there.

Traditional telepresence technologies offer limited interactivity, however. A user of traditional telepresence technologies cannot visualize himself/herself in the same location as a second user with whom he/she is conversing remotely, and cannot visualize himself/herself touching or otherwise interacting cooperatively with the second user. Thus, there is a need for improved telepresence technologies.

SUMMARY OF THE PRESENTLY CLAIMED INVENTION

A first claimed embodiment of the present invention involves a method for telepresence communication. The method includes generating a first avatar to represent a first user and receiving data corresponding to a second avatar to represent a second user, wherein the second user is remote from the first user. The method also includes receiving a first visual dataset identifying a first movement made by the first user as captured by a first capture device, and receiving a second visual dataset identifying a movement made by the second user as captured by a second capture device. The method also includes generating a first movement representation of the first movement by the first avatar and generating a second movement representation of the second movement by the second avatar. The method also includes rendering a virtual space to be displayed via a first display and rendering the first avatar performing the first movement representation and the second avatar performing the second movement representation within the virtual space be displayed via the first display.

A second claimed embodiment of the present invention concerns a system for telepresence communication. The system includes a first capture device to capture a first visual dataset identifying a first movement made by the first user. The system also includes a communication transceiver to receive data corresponding to a second avatar to represent a second user and to receive a second visual dataset identifying a movement made by the second user as captured by a second capture device, wherein the second user is remote from the first user. The system also includes a memory to store instructions, and a processor coupled to the memory, wherein execution of the instructions by the processor causes the system to perform system operations. The system operations include generating a first avatar to represent the first user, generating a first movement representation of the first movement by the first avatar, and generating a second movement representation of the second movement by the second avatar. The system operations also include rendering a virtual space to be displayed via a first display, and rendering the first avatar performing the first movement representation and the second avatar performing the second movement representation within the virtual space to be displayed via a first display.

A third-claimed embodiment of the present invention concerns a system for telepresence communication. The system includes a communication transceiver to receive a first visual dataset identifying a first movement made by the first user as captured by a first capture device, to receive a second visual dataset identifying a movement made by the second user as captured by a second capture device, to receive data corresponding to a first avatar to represent a first user, and to receive data corresponding to a second avatar to represent a second user, wherein the second user is remote from the first user. The system also includes a memory to store instructions, and a processor coupled to the memory, wherein execution of the instructions by the processor causes the system to perform system operations. The system operations include generating a first avatar to represent the first user based on the data corresponding to a first avatar and generating a second avatar to represent the second user based on the data corresponding to a second avatar. The system operations also include generating a first movement representation of the first movement by the first avatar and generating a second movement representation of the second movement by the second avatar. The system operations also include rendering a scene, the scene including the first avatar performing the first movement representation and the second avatar performing the second movement representation within a virtual space, and transmitting information corresponding to the rendered scene.

DETAILED DESCRIPTION

A telepresence communication uses information captured by a first capture device about a first user and information captured by a second capture device about a second user to generate a first avatar corresponding to the first user and a second avatar corresponding to the second user. A scene can be rendered locally or by a remote server in which the first avatar and the second avatar are both rendered in a virtual space. The first avatar is rendered to move based on movements made by the first user as captured by the first capture device, and the second avatar is rendered to move based on movements made by the second user as captured by the second capture device. The avatars may be realistic, based on avatar templates, or some combination thereof. The rendered scene may include virtual interactive objects that the avatars can interact with.

Figure 1:
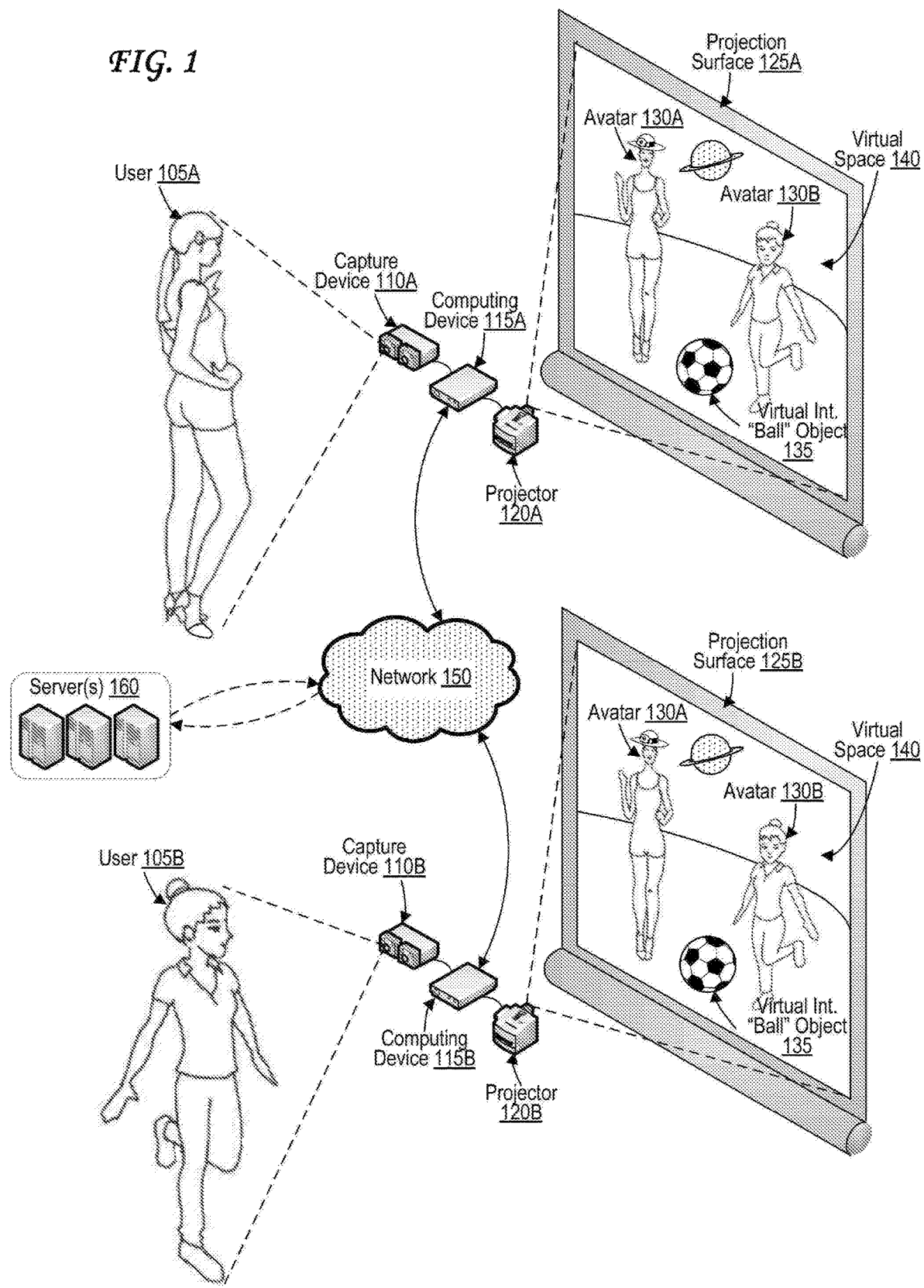
FIG. 1 illustrates an ecosystem for a telepresence communication.

FIG. 1 illustrates an ecosystem for a telepresence communication.

The ecosystem of FIG. 1 includes two "telepresence setups"—the first "telepresence setup" corresponding to a first user 105A, and the second "telepresence setup" corresponding to a second user 105B. The first "telepresence setup" includes a first capture device 110A, a first computing device 115A, a first projector 120A, and a first projection surface 125A. The second "telepresence setup" includes a second capture device 110B, a second computing device 115B, a second projector 120B, and a second projection surface 125B.

The capture devices 110 capture data about their corresponding users 105, and optionally may also capture data about the real-world environments in which those users 105 are located. The captured data may include visual data, such as images or video data, as provided by one or more cameras of each capture device 110. The captured data may also include depth data, provided by one or more depth sensors of each capture device 110, by extrapolation using multiple cameras having slightly different perspectives, or some combination thereof. Depth sensors may include laser rangefinders, sonar sensors, radar sensors, midar sensors, lidar sensors, or some combination thereof. Depth sensors may also include light sources that emit lasers or other types of light and sensors to perform depth imaging via dynamic light/laser scattering (DLS) analysis. The captured data may also include movement data, which can be captured as visual data distance data as described above or can be captured separately based on data from motion sensors of each capture device 110. In this way, each capture device 110 can capture enough information about a user 105 that a three-dimensional avatar 130 can be generated based on the likeness of the user 105, and that three-dimensional avatar 130 can be moved to track movements made by the user 105.

Each capture device 110 may include a variety of light sensors, cameras, depth sensors, motion sensors, or some combination thereof. For example, each capture device 110 may include a Microsoft Kinect™ device, an Intel RealSense™ device, a SoftKinetic DepthSense™ device, a Sony Playstation Move™ device, or some combination thereof.

Figure 13:
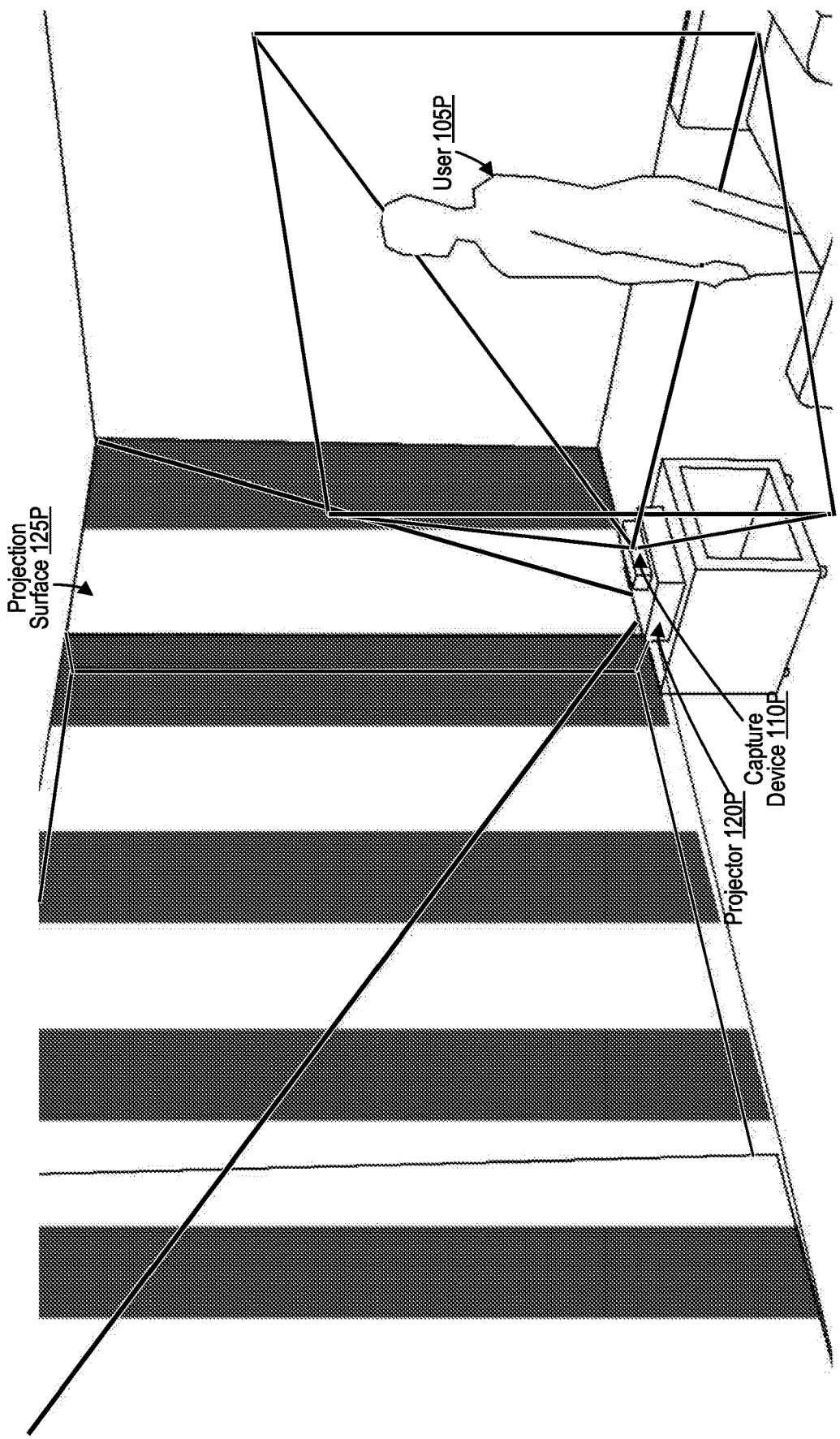
FIG. 13 illustrates a capture device scanning a user and a projection surface to generate topography and depth data for both.

Each capture device 110 may also capture data about the corresponding projection surface 125, for example to allow a scene to be projected accurately despite irregularities in the corresponding projection surface 125. This process is illustrated in FIG. 13 and described further in the description of FIG. 13.

Capture device 110A is connected to a computing device 115A and a projector 120A. Capture device 110B is connected to a computing device 115B and a projector 120B. Computing device 115A and computing device 115B are connected via a communication network 150, which may include network hardware in a private network, network hardware in the public Internet, or some combination thereof. For example, the communication network 150 may pass through a local area network (LAN), a wireless local area network (WLAN), a municipal area network (MAN), a wide area network (WAN), or some combination thereof. Communications may pass from the computing device 115A to the computing device 115B via communication network 150 using a variety of network protocols and communication protocols, communications of 802.11 Wi-Fi protocols or cellular telephone network protocols such as 3G, 4G, or LTE.

Computing device 115A may use the data captured by capture device 110A to generate an avatar 130A based on the user 105A. The avatar 130A may be three-dimensional. The computing device 115A may use movement data captured by capture device 110A to understand movements made by the user 105A and to make the avatar 130A make the same movements as the user 105A, a process that may take place in real-time, with a predetermined delay, or at a later point in time.

An avatar 130 may be realistically based on a user 105, for example having the same facial features, clothing, and body shape. Alternately, the avatar 130 may be intentionally unrealistic, for example by mapping the movements of the user 105 to facial features of a celebrity, a movie star, a politician, a video game character, or another user. The avatar 130 may be an amalgam of realistic elements and intentionally unrealistic elements—for example, the face of the user 105 may be used in the avatar 130A, but the avatar 130 may be given different clothing or a different body shape. Alternately, body of the user 105 may be used in the avatar 130, but the avatar 130 may be given the face of a celebrity, a movie star, a politician, a video game character, or another user.

In the example of FIG. 1, the avatar 130A looks identical to the user 105A, but wears a hat that the user 105A is not wearing. The avatar 130B of FIG. 1 looks identical to the user 105B.

The computing device 115A may generate a scene into which the avatar 130A is placed. The scene may include a virtual three-dimensional space 140, one or more virtual interactive objects 135, and one or more other avatars. The scene, once generated by the computing device 115A, is then projected by a projector 120A onto a projection surface 125A, or can alternately be displayed by a different type of display system 1370, such as an LCD display or an OLED display.

The scene of FIG. 1 includes a virtual space 140, illustrated as a surface with a ringed planet in the sky to simulate being in outer space. The scene of FIG. 1 includes a first avatar 130A corresponding to the first user 105A and a second avatar 130B corresponding to the second user 105B positioned within the virtual space 140. The scene of FIG. 1 also includes a virtual interactive object 135 in the form of a virtual soccer ball, which may, for example, be programmed to interact with avatar 130A and/or avatar 130B according to a physics engine 820 that directs how the virtual soccer ball should move in response to collisions, virtual terrain in the virtual space 140, virtual friction in the virtual space 140, virtual gravity in the virtual space 140, virtual magnetism in the virtual space 140, other virtual forces within the virtual space 140, or some combination thereof.

The scene displayed can be calibrated by scale. For example, the avatars 130 and/or virtual interactive objects 135 can be displayed so as to appear life-sized (1:1) in scale. This is easiest to do with a projector, but can also be done with a large screen, or with a smaller screen that only shows part of the scene. For example, a scene can be displayed where only a subset an avatar 130 is visible, such as a head and torso, while other portions of the avatar 130 are off screen or outside the bounds of the projection surface 125, such as limbs or portions thereof. Avatars 130 and/or virtual interactive objects 135 can alternately be displayed so as to appear smaller than life-sized—i.e., 1:X, where X is a number greater than one. Avatars 130 and/or virtual interactive objects 135 can alternately be displayed so as to appear larger than life-sized—i.e., X:1, where X is a number greater than one. In some scenes, different avatars 130 and/or virtual interactive objects 135 can be rendered at different scales.

The first computing device 115A may receive information about the second avatar 150B over the communication network, either from the second computing device 115 directly from the second capture device 110B. That is, the information that the first computing device 115A about the second avatar 150B may be visual/depth/motion information about the second user 105B as captured by the second capture device 110B, in which case the first computing device 115A is left to generate the second avatar 130B. Alternately, the second computing device 115 can generate the second avatar 130B and send either information describing a fully or partially generated version of the second avatar 130B to the first computing device 115A. Alternately, the second computing device 115 can generate the second avatar 130B and send a two-dimensional or three-dimensional image/video version of the second avatar 130B to the first computing device 115A for direct insertion into the scene as projected by the projector 120A.

The second computing device 115B of FIG. 1 may behave much like the first computing device 115A of FIG. 1, though it receives captured visual/depth/motion information directly about user 105A directly from the second capture device 110B and outputs its scene to projector 120B, to be projected onto projection surface 125B. The scene generated by the second computing device 115B of FIG. 1 is the same scene as the one generated by the first computing device 115A.

The ecosystem of FIG. 1 may also include one or more servers 160 located remote from the users 105A and 105B. In some cases, some of the operations discussed herein as performed by a computing device 115 local to a user 105 may instead be performed at the remote server(s) 160. For example, after the first capture device 110A captures visual/depth/motion information about the first user 105A, the captured information may be sent by the first computing device 115A to the remote servers 160, which may then generate the first avatar 130A and send information describing the first avatar 130A back to the first computing device 115A as well as to the second computing device 115B. The information sent from the remote servers 160 to the first computing device 115A and the second computing device 115B may be information that requires a lower bandwidth, such as two-dimensional or three-dimensional video data rather than full three-dimensional model data. This can increase performance and allow the first computing device 115A and the second computing device 115B to be cheaper, less powerful computers, such as mobile phones or other mobile devices, since the most demanding generation tasks are offloaded to the remote servers 160.

While each computing device 115 of FIG. 1 is illustrated as a separate device from its connected capture device 110 and projector 120, it should be understood that any two or more of these devices may be incorporated together into a single device.

Each computing device 115 may be any type of computing device 1500, or may include at least a subset of the components of a computing device 1500. Each capture device 110 may be any type of computing device 1500, or may include at least a subset of the components of a computing device 1500. Each projector 115 may be any type of computing device 1500, or may include at least a subset of the components of a computing device 1500. Each projector 115 may be replaced with a different type of display system 1370, such as an LCD display or an OLED display.

Figure 2:
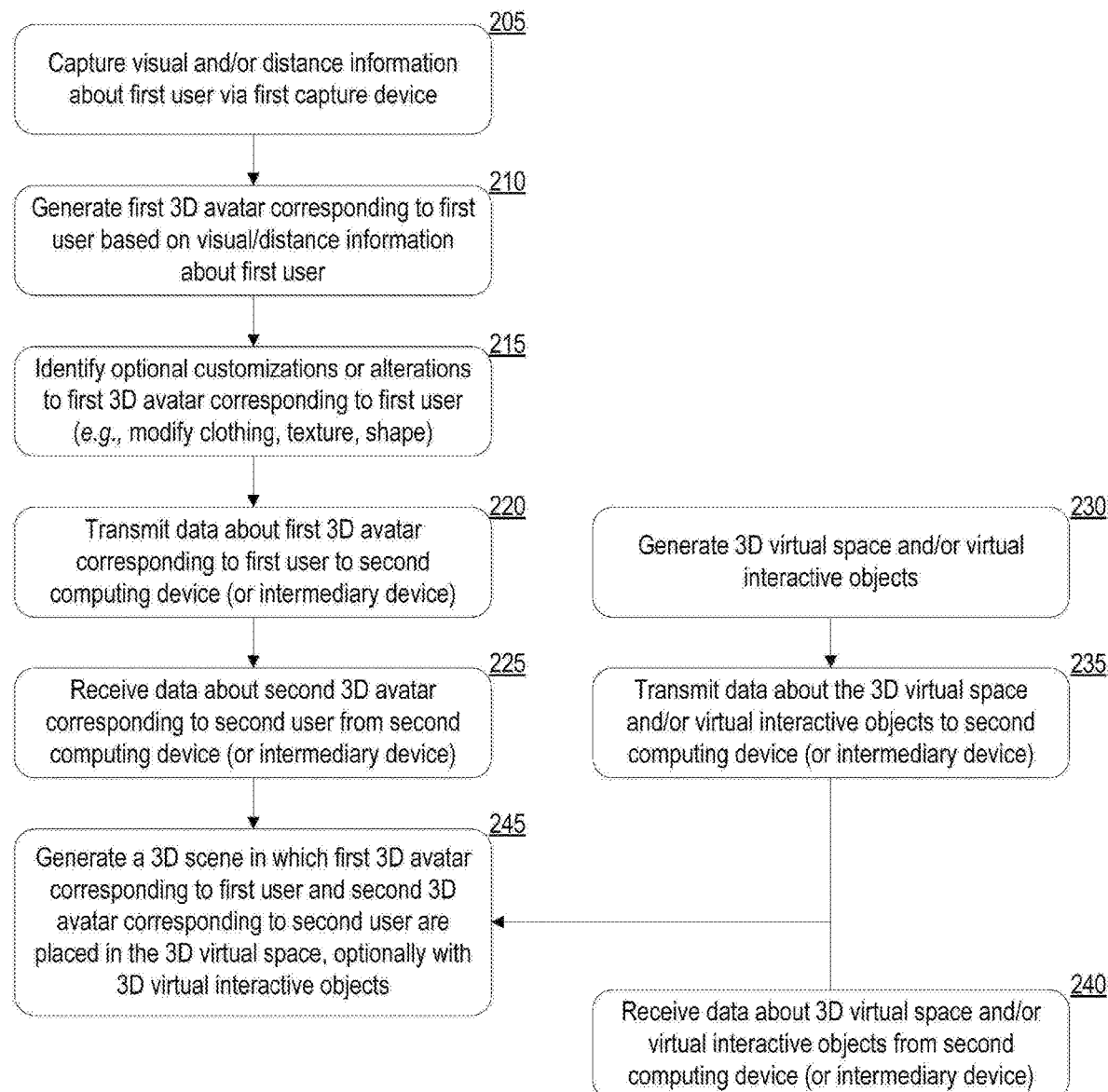
FIG. 2 is a flow diagram illustrating a process for communication of telepresence information.

FIG. 2 is a flow diagram illustrating a process for communication of telepresence information.

At step 205, a first computing device 115A receives visual and/or distance information about a first user 105A, captured by a first capture device 110A. The step 210, the first computing device 115A generates a three-dimensional first avatar 130A corresponding to the first user 150A based on the visual and/or distance information about a first user 105A that was captured by a first capture device 110A. The three-dimensional first avatar 130A may include a three-dimensional model and a surface texture, both of which may be at least partially based on the appearance of the first user 105 as captured by the visual and/or distance information captured by the first capture device 110A. At step 215, the first computing device 115A identifies optional customizations or alterations to the three-dimensional first avatar 130A, such as an addition of a hat, or a different set of clothes (e.g., a formal suit to replace a t-shirt and jeans), or a slimmer/bulkier physique, or a different set of facial features. These customizations may change at least a subset of the model and/or the surface texture of the originally generated first avatar 130A.

At step 220, the first computing device 115A transmits information describing the finished first avatar 130A, with any optional customizations included, to the second computing device 115B, or to an intermediary device such as the remote server 160 that then sends this information on to the second computing device 115B so that the second computing device 115B can generate a scene featuring the first avatar 130A. At step 225, the first computing device 115A receives information describing a finished second avatar 130B, with any optional customizations included, from the second computing device 115B, or from an intermediary device such as the remote server 160 that then sends this information on to first computing device 115A as it was received from the second computing device 115B, so that the first computing device 115A can generate a scene featuring the second avatar 130B.

At step 245, the first computing device 115A generates a three-dimensional scene in which the first avatar 130A and the second avatar 130B are placed into a three-dimensional virtual space 140, optionally along with three-dimensional virtual interactive objects 135.

The virtual space 140 and/or virtual interactive objects 135 can be generated at first computing device 115A at step 230. Information about the generated virtual space 140 and/or virtual interactive objects 135 can then be transmitted from the first computing device 115A to the second computing device 115B, or to an intermediary device such as the remote server 160 that then sends this information on to the second computing device 115B, at step 235.

Alternately, the virtual space 140 and/or virtual interactive objects 135 can be generated at the second computing device 115B and/or at remote server 160. Information about the generated virtual space 140 and/or virtual interactive objects 135 can then be transmitted to the first computing device 115A from the second computing device 115B or from the remote server 160 at step 240.

It should be understood that any steps performed by the first computing device 115A or by the second computing device 115B in the process of FIG. 2 could alternately be performed by the remote server(s) 160.

Figure 3:
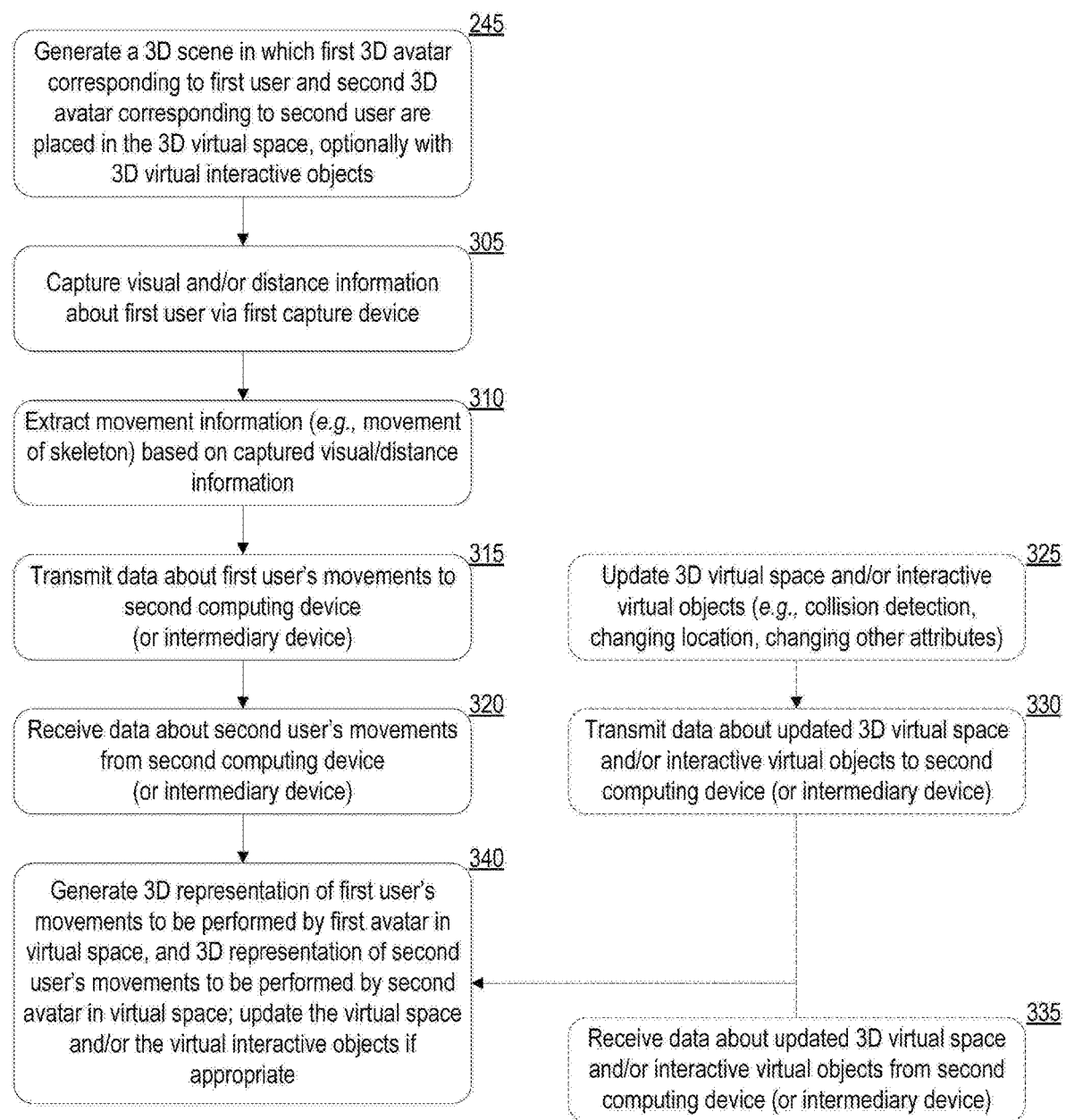
FIG. 3 is a flow diagram illustrating a process for communication of movement information.

FIG. 3 is a flow diagram illustrating a process for communication of movement information.

The process of FIG. 3 begins with step 245 of FIG. 2, namely the generation of a three-dimensional scene incorporating first avatar 130A and second avatar 130B into virtual space 140 with virtual interactive objects 135. At step 305, a first computing device 115A receives visual and/or distance information about a first user 105A, captured by a first capture device 110A. At step 310, the computing device 115A extracts movement information describing movement of the first user 105A. The movement information can be encoded so as to describe movement of a "skeleton" of the user that is made up of key points within the user's body, such as the skeleton 710 of FIG. 7.

At step 315, the first computing device 115A transmits the information describing movements of the first user 105A and/or movements of the corresponding first avatar 130A, to the second computing device 115B, or to an intermediary device such as the remote server 160 that then sends this information on to the second computing device 115B, so that the second computing device 115B can generate a scene featuring accurate movements by the first avatar 130A. At step 320, the first computing device 115A receives information describing movements of the second user 105B and/or movements of the corresponding second avatar 130B, from the second computing device 115B, or from an intermediary device such as the remote server 160 that then sends this information on to first computing device 115A as it was received from the second computing device 115B, so that the first computing device 115A can generate a scene featuring accurate movements by the second avatar 130B.

At step 340, the first computing device 115A generates a representation of the movements of the first user 105A as captured in step 305 and extracted in step 310, and has the first avatar 130A perform the generated representation of the movements of the first user 105A. The first computing device 115A also generates a representation of the movements of the second user 105B as received in step 320, if they were not already pre-generated as received in step 320, and has the second avatar 130B perform the generated representation of the movements of the second user 105B. The first computing device 115A also updates the virtual space 140 and any virtual interactive objects as appropriate.

Updates to the virtual space 140 and/or virtual interactive objects 135 can be generated at first computing device 115A at step 325. For example, a condition such as any of those described in FIG. 5, such as a gesture by an avatar, or a collision between one virtual interactive object 135 and another, or a collision between one virtual interactive object 135 and an avatar 130, can result in motion of the virtual interactive object 135 as directed by a physics engine 820, or can "damage" the virtual interactive object 135 by changing its visual and/or movement attributes, or can change colors of the virtual interactive object 135. The virtual space 140 can likewise be modified as a result of collisions, gestures, or other conditions as described in FIG. 5. Information about updates to the generated virtual space 140 and/or virtual interactive objects 135 can then be transmitted from the first computing device 115A to the second computing device 115B, or to an intermediary device such as the remote server 160 that then sends this information on to the second computing device 115B, at step 330.

Alternately, updates to the virtual space 140 and/or virtual interactive objects 135 can be generated at the second computing device 115B and/or at remote server 160. Information about the generated virtual space 140 and/or virtual interactive objects 135 can then be transmitted to the first computing device 115A from the second computing device 115B or from the remote server 160 at step 240.

It should be understood that any steps performed by the first computing device 115A or by the second computing device 115B in the process of FIG. 3 could alternately be performed by the remote server(s) 160.

Figure 4:
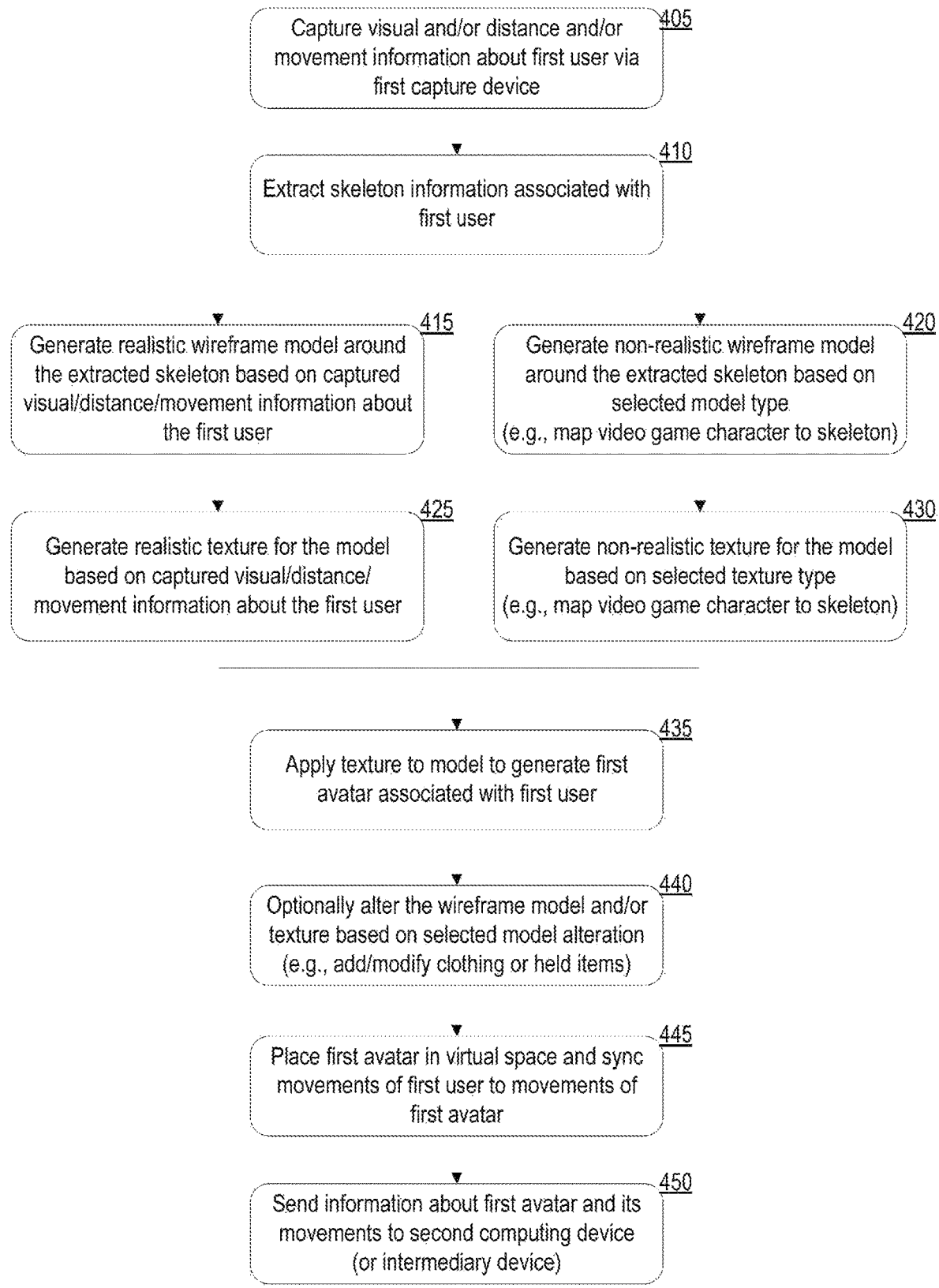
FIG. 4 is a flow diagram illustrating a process for generating an avatar.

FIG. 4 is a flow diagram illustrating a process for generating an avatar.

At step 405, a first computing device 115A receives visual, depth, and/or movement information about a first user 105 as captured by a first capture device 110A. At step 410, the first computing device 115A extracts skeleton information associated with the first user 105. The "skeleton" of the user that is made up of key points within the user's body, such as the skeleton 710 of FIG. 7.

Figure 7:
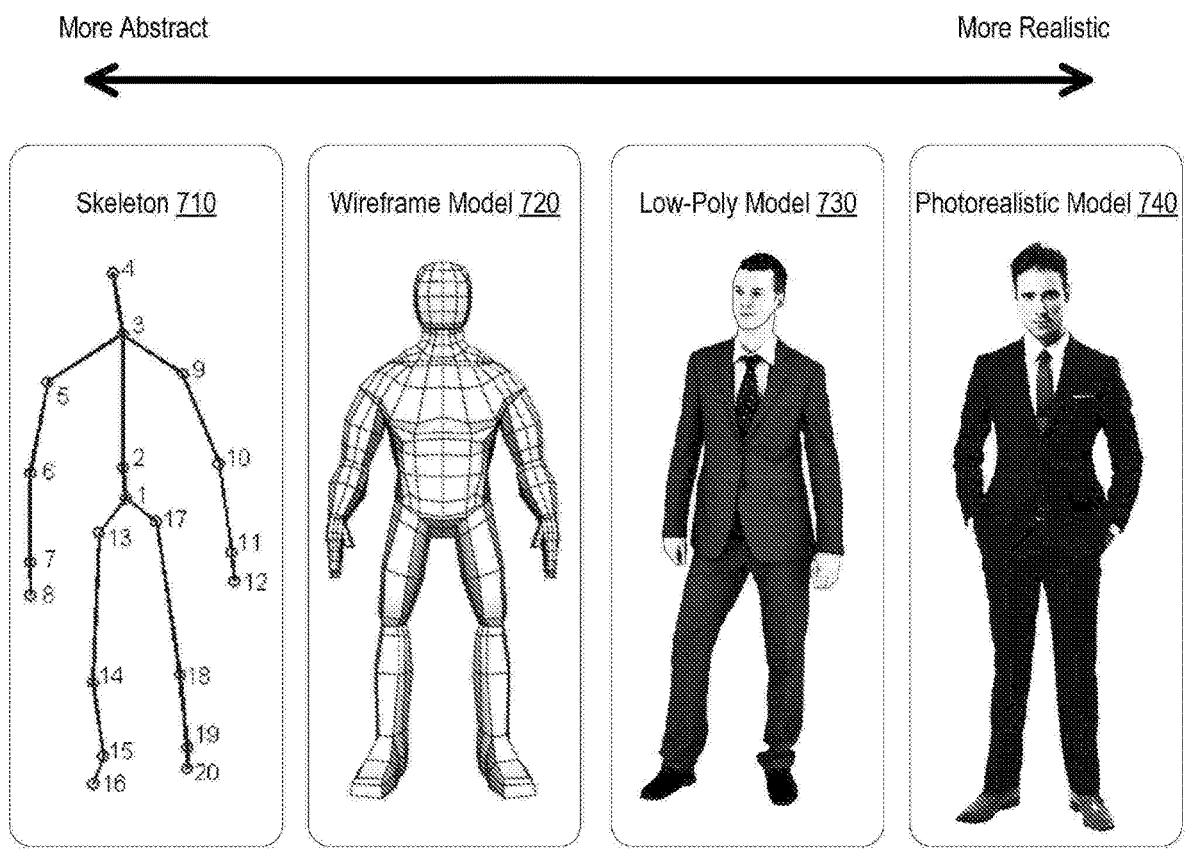
FIG. 7 illustrates different types of avatars.

At step 415, the first computing device 115A generates a realistic wireframe model around the extracted skeleton based on captured visual/distance/movement information about the first user 105A. In particular, the model can recreate the shape of the body of the first user 105A and any clothes that the first user 105 is wearing. The model can be recreated using varying degrees of realism, as illustrated in FIG. 7. Specific points on the model can be made to match the skeleton extracted in step 410, so that the hands, legs, and head of the model are positioned as in the hands, legs, and head of the skeleton, respectively.

At step 420, the first computing device 115A instead generates an intentionally non-realistic wireframe model around the extracted skeleton based on captured visual/distance/movement information about the first user. For example, the first computing device 115A can obtain a model from a database of model templates stored accessible from the first computing device 115A or from the remote server 160, or can obtain a model by downloading it from an Internet resource. The model can, for example, represent a celebrity, a movie star, a politician, a video game character, or another user. Specific points on the model can be made to match the skeleton extracted in step 410, so that the hands, legs, and head of the model are positioned as in the hands, legs, and head of the skeleton, respectively.

It should be understood that while step 415 and step 420 are illustrated as alternate steps, an avatar may in some cases have some portions modeled realistically and others portions modeled non-realistically, such as a realistic head with a non-realistic body that allows the user to be viewed wearing a different outfit, having a different hairstyle or facial hair style, or that gives the user different body proportions, such as more visually flattering proportions, or proportions producing a cartoonish appearance. The models may be polygonal models, voxel-based models, or other kinds of three-dimensional models.

At step 425, the first computing device 115A generates a realistic surface texture for the model generated in step 415 or step 420 based on captured visual/distance/movement information about the first user 105A. In particular, the model can recreate surface textures and colors of any portions of the face, body, and clothing of the first user 105 based on captured visual/distance/movement information about the first user 105A. Specific portions of the surface texture can be made to match the model, so that the hands, legs, and head of the surface texture are matched with the hands, legs, and head of the model, respectively. The surface texture may be based on pixel-based image data, with pixel colors defined using RGB, CMYK, HTML, greyscale, or binary black/white data. The surface texture may be based on vector data.

At step 430, the first computing device 115A generates an intentionally non-realistic surface texture for the model generated in step 415 or step 420. For example, the first computing device 115A can obtain a model from a database of surface textures stored accessible from the first computing device 115A or from the remote server 160, or can obtain a model by downloading it from an Internet resource. The surface textures can, for example, represent a celebrity, a movie star, a politician, a video game character, or another user. Specific portions of the surface texture can be made to match the model, so that the hands, legs, and head of the surface texture are matched with the hands, legs, and head of the model, respectively.

It should be understood that while step 425 and step 430 are illustrated as alternate steps, an avatar may in some cases have some portions textured realistically and others portions textured non-realistically, such as a realistic head with a non-realistic body that allows the user to be viewed wearing a different outfit, or having a different skin tone or hair color or hairstyle or facial hair style.

At step 435, first computing device 115A applies the surface texture generated in step 425 or step 430 to the model generated in step 415 or step 420 to generate the avatar 130A of the first user 105A. At step 440, the first computing device 115A can optionally alter the model generated in step 415 or step 420 and/or the surface texture generated in step 425 or step 430. These optional alterations may be based on user selections, and may modify attributes such as an outfit, body shape, hairstyle, skin tone, or facial hair style of the avatar 130A.

At step 445, the first computing device 115A places the first avatar 130A into the virtual space 140 and syncs the movements of the first avatar 130A to the movements of the first user 105A as described in FIG. 3, which includes sending information about the first avatar 130A and its movements to the second computing device 105B or an intermediary device such as the remote server 160 in step 450.

It should be understood that any steps performed by the first computing device 115A or by the second computing device 115B in the process of FIG. 4 could alternately be performed by the remote server(s) 160.

Figure 5:
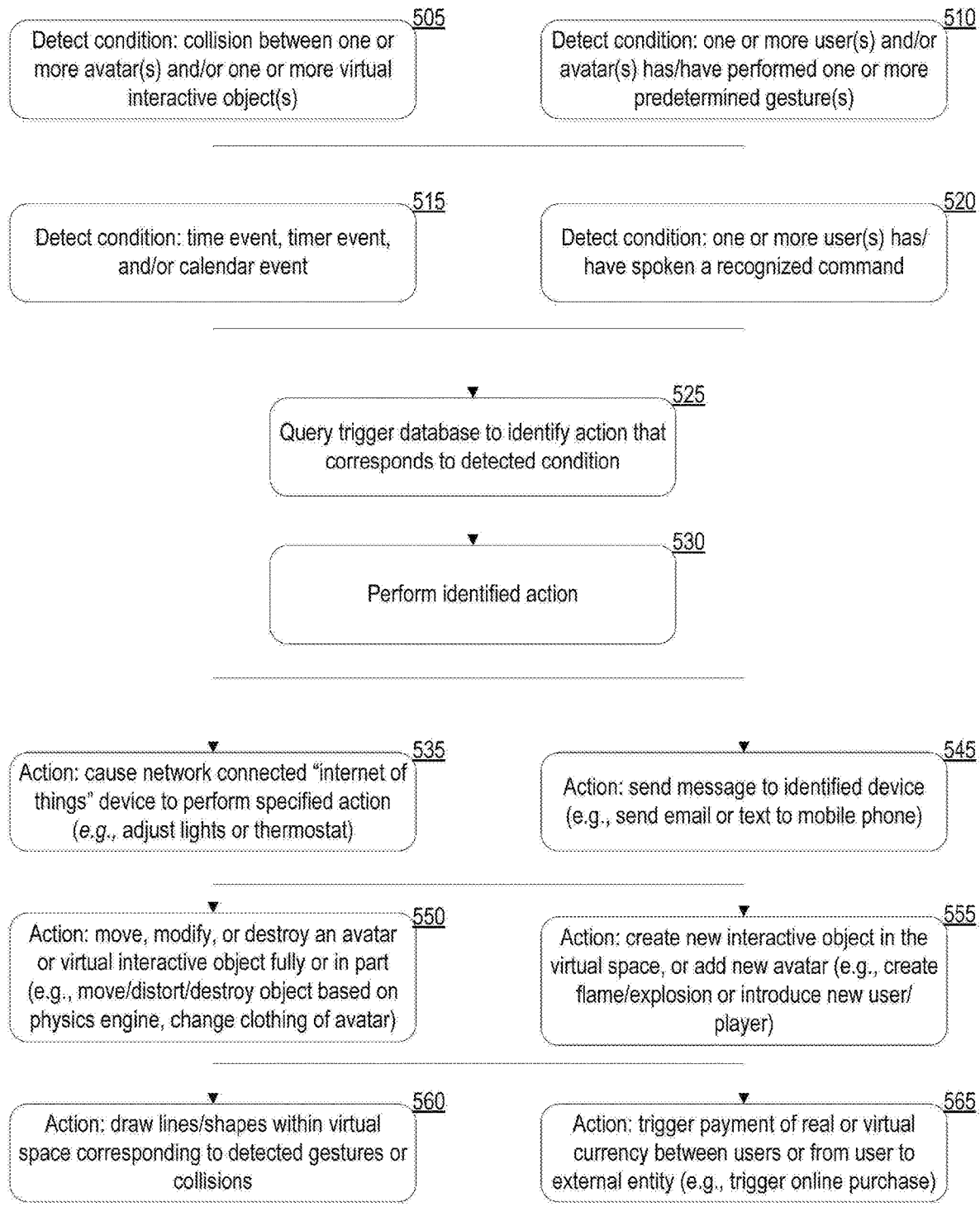
FIG. 5 is a flow diagram illustrating a process for triggering actions based on detected conditions.

FIG. 5 is a flow diagram illustrating a process for triggering actions based on detected conditions.

A number of trigger conditions, when met during a telepresence interaction, can trigger a number of different actions, both in the virtual space 140 and in the real world. Some types of trigger conditions 505-520 are enumerated in FIG. 5, and some types of actions 535-565 are also enumerated in FIG. 5.

At step 525, at least one of the first computing device 105A, the second computing device 105B, or the remote servers 160, or some combination thereof detects a trigger condition and queries a trigger database to identify an action corresponding to that detected trigger condition. At step 530, the first computing device 105A, the second computing device 105B, the remote servers 160, or some combination thereof causes the action to occur.

One type of trigger condition is a collision detection trigger condition 505. The boundaries of each avatar 130 and each virtual interactive object 135 in the virtual space 140 are tracked by the first computing device 105A, the second computing device 105B, the remote servers 160, or some combination thereof. One of these devices may then identify when boundaries of two or more avatars 130 have collided in a particular way, or when an avatar 130 has collided with a virtual interactive object 135 in a particular way, or when two or more virtual interactive objects 135 have collided in a particular way. For example, a trigger condition can be met when it is identified that one avatar 130 has "punched" another avatar 130, or when one avatar 130 has "kissed" another avatar 130, or when one avatar 130 has "hugged" another avatar 130, or when an avatar 130 has kicked a virtual interactive "ball" object 135 as in FIG. 1, or when an avatar 130 has touched a virtual interactive "button" or "switch" object 135, or when a virtual interactive "bullet" or "arrow" object 135 has collided with an avatar 130, or when a virtual interactive "ball" or "puck" object 135 has entered a virtual interactive "goal" or "basket" object 135, or when a virtual interactive "bullet" or "arrow" object 135 has collided with a virtual interactive "target" object 135.

Another type of trigger condition is a gesture condition 510. One or more gestures performed by one or more users 105 and/or avatars 130 can, when recognized, trigger a particular action. For example, in a dance game, a particular dance move, when performed correctly by one or several users 105 or avatars 130, can trigger a reward action. In another example, a swipe gesture might be used to change outfits or to modify some other attribute of an avatar 130 or virtual interactive object 135.

Another type of trigger condition is a time-based event 515. A particular absolute time, such as 12:00 P.M. Pacific Time, can trigger an action. A particular relative time, such as 1 hour from starting a telepresence communication, or 15 minutes from a previous action, can also trigger an action. A timer event, such as a "best time" event, can also trigger an action. A calendar event, such as detection of a holiday, birthday, or weekend, can also trigger an action.

Another type of trigger condition is a spoken command 520. Each capture device 110 may include one or more microphones, which may be used to receive audio. The audio may be analyzed by the first computing device 105A, the second computing device 105B, the remote servers 160, or some combination thereof, to perform speech recognition. If the speech includes a recognized command, such as a command found in a speech command database, this may trigger an action.

One type of action is a network-connected-device action 535. A trigger condition can induce an action to be taken at a network-connected-device, also known as an "internet of things" device. For example, a trigger condition can be used to dim lights, brighten lights, turn on/off lights, change light colors/shades, modify a thermostat temperature, turn on/off a heater, turn on/off an air conditioner, turn on/off a ventilation device, turn on/off a fan, turn on/off a kitchen appliance, turn on/off a laundry appliance, turn on/off an energy generator device, turn on/off an energy storage device, turn on/off a wired or wireless router, modify router settings, turn on/off a vacuum cleaner, turn on/off a vehicle, or induce a vehicle to automatically drive to pre-determined location.

Another type of action is a transmission action 545. A trigger condition can induce a message to be sent. The message may be directed from the first computing device 105A, the second computing device 105B, or the remote servers 160. The message may be directed to the first computing device 105A, the second computing device 105B, or a personal device of a user 105. The personal device of the user 105 may be any type of computing device 1500, or may include at least a subset of the components of a computing device 1500. The message may be an email message, or a SMS text message, or an MMS multimedia message, or a message using a messenger service. Such messenger services may include Sony® Playstation® Messages™, Apple® iMesssage™, Apple® Facetime™, Facebook® Messsenger™, Google® Hangouts™, Google® Allo™, Google® Duo™, Steam® Chat™, Microsoft® Messenger™, Microsoft® Lync™, Microsoft® Skype™, Yahoo® Messenger™, AOL® Instant Messenger™, LinkedIn® Messages™, Slack®, or similar services.

Another type of action is a motion, modification, or destruction action 550. A trigger condition can induce motion or modification in an avatar 130, in a virtual interactive object 135, or some combination thereof. Motion can be governed by a physics engine 820, which may take into account virtual terrain in the virtual space 140, virtual friction in the virtual space 140, virtual gravity in the virtual space 140, virtual magnetism in the virtual space 140, other virtual forces within the virtual space 140, or some combination thereof. For example, a force of impact can be calculated based on virtual weights and speeds in the event of a collision detection trigger condition 505, and the physics engine can determine how the object should move based on or be modified/destroyed based on these and other forces at play. Modification can simulate distortion, destruction, or discoloration based on the virtual physics engine 820 if a force is great enough of if a virtual interactive object 135 is "weak." Modification or destruction of at least portions of avatars 130 or virtual interactive objects 135 need not be physics-based—for example, a trigger condition could cause clothing or other attributes of an avatar 130 or a virtual interactive object 135 to be modified. A motion/modification/destruction action 550 may, in some cases, modify, move, or destroy at least a portion of the virtual space 140 as well, such as to create an impact crater from an explosion.

Another type of action is a creation action 555. A trigger condition can induce creation of a virtual interactive object 135 or avatar 130. A creation action may accompany a motion/modification/destruction action 550 in some cases—for example, a motion/modification/destruction action 550 can destroy a particular virtual interactive object 135 and an accompanying creation action 555 can then create a new virtual interactive object 135 that represents a fire, an explosion, or a cloud of smoke. A creation action can create one or more new avatars 130 or one or more new virtual interactive objects 135 One or more new avatars 130 can be created as a result of a trigger condition that grants permission for another user 105 to join the telepresence communication.

Another type of action is a drawing action 560. A trigger condition can induce lines or other shapes to be drawn within the virtual space 140. This can include overlay information such as the automatically generated overlay information 920 of FIG. 9, or can include "hand-drawn" information drawn by a user 105 and/or by an avatar 130 such as the drawings 1010 and 1020 of FIG. 10. Such "hand-drawn" information may be drawn according to gesture detection conditions 510 in the case of "mid-air" drawings or collision detection conditions 505 in the case of drawing on a virtual interactive "whiteboard" or "chalkboard" type object 135, which may include an opaque surface, a semitransparent surface, or an invisible surface, and may be planar or some other shape.

Another type of action is a payment action 565. A trigger condition can induce payment from an account associated with a first user 105A to an account associated with a second user 105B, or to an account associated with a third-party entity. For example, a trigger condition can induce an online purchase to be made from an online vendor, either to buy a digital good/service or a real-world good/service. For example, a trigger condition can induce an online purchase of a music subscription service, a video subscription service, a video game subscription service, one or more music pieces, one or more videos, one or more video games, or one or more video game content sets. Video game content sets are often referred to as "downloadable content" ("DLC") or "in-app purchases" ("IAP").

It should be understood that any steps performed by the first computing device 115A or by the second computing device 115B in the process of FIG. 5 could alternately be performed by the remote server(s) 160.

Figure 6:
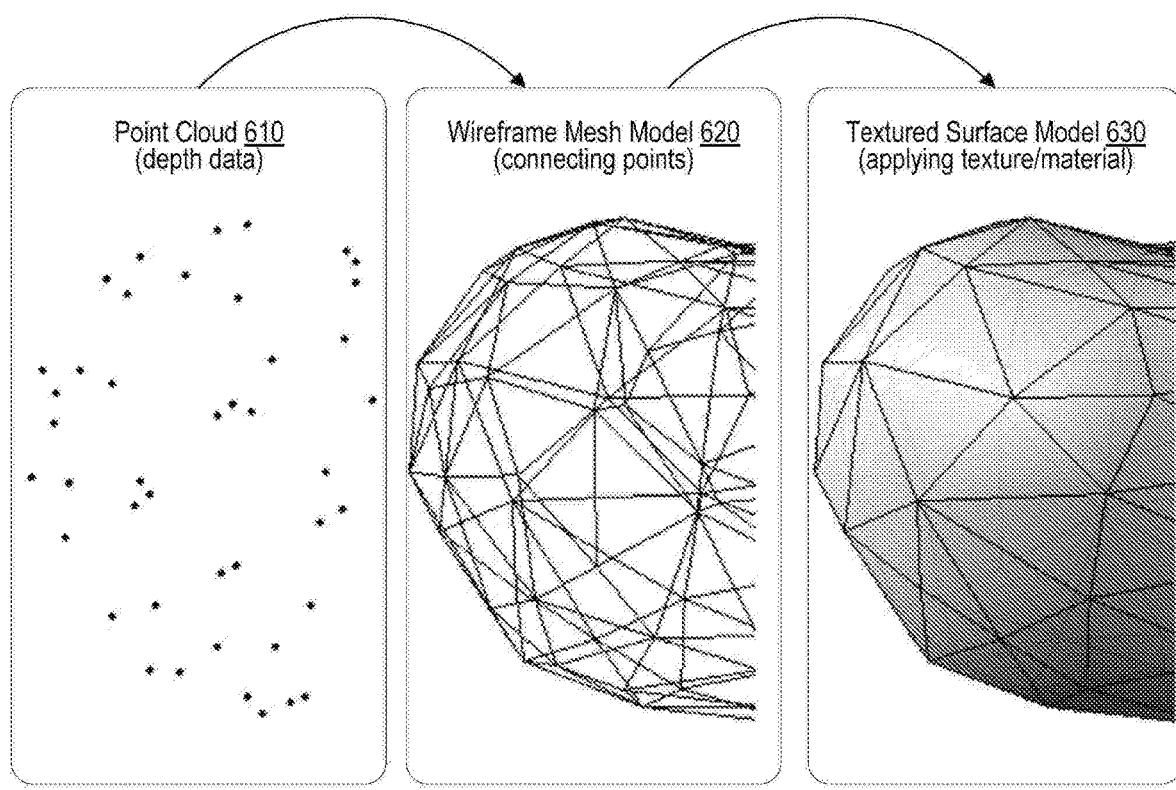
FIG. 6 illustrates use of depth data to generate an avatar.

FIG. 6 illustrates use of depth data to generate an avatar.

In particular, FIG. 6 illustrates a point cloud 610, which identifies a number of points at different depths as detected by a capture device 110. Next, FIG. 6 illustrates a wireframe mesh model 620, in which some or all of the points in the point cloud 610 are connected by lines to generate a model. Next, FIG. 6 illustrates a textured surface model 630, in which a shaded surface texture is applied to various planar surfaces created by the lines of the wireframe mesh model 620.

FIG. 7 illustrates different types of avatars.

In particular, FIG. 7 illustrates a skeleton model 710, in which various focal points are extracted from visual/depth/motion information captured by a capture device 110 representing a head, neck, shoulders, elbows, hands, spine, hips, knees, feet, and other joints. A more robust model can be built up around a skeleton model 710.

For example, FIG. 7 next illustrates a wireframe model 720, built up using visual/depth/motion data captured by a capture device 110 and created using methods similar to those illustrated in FIG. 6. Next, FIG. 7 illustrates a low-polygon model 730, which applies a realistic texture to the wireframe model 720. Next, FIG. 7 illustrates a photorealistic model 740, which is similar to the low-polygon model 730, but uses a higher quality model and higher quality surface texture based on an increased resolution of visual/depth/motion data captured by a capture device 110.

It should be understood that while low-polygon model 730 and photorealistic model 740 are referred to as "more realistic," these need not be based on a user 105. As discussed with regard to steps 420 and 430 of FIG. 4, these may be intentionally non-realistic in comparison to the corresponding user 105, and may instead be based on a celebrity, a movie star, a politician, a video game character, or another user.

Figure 8:
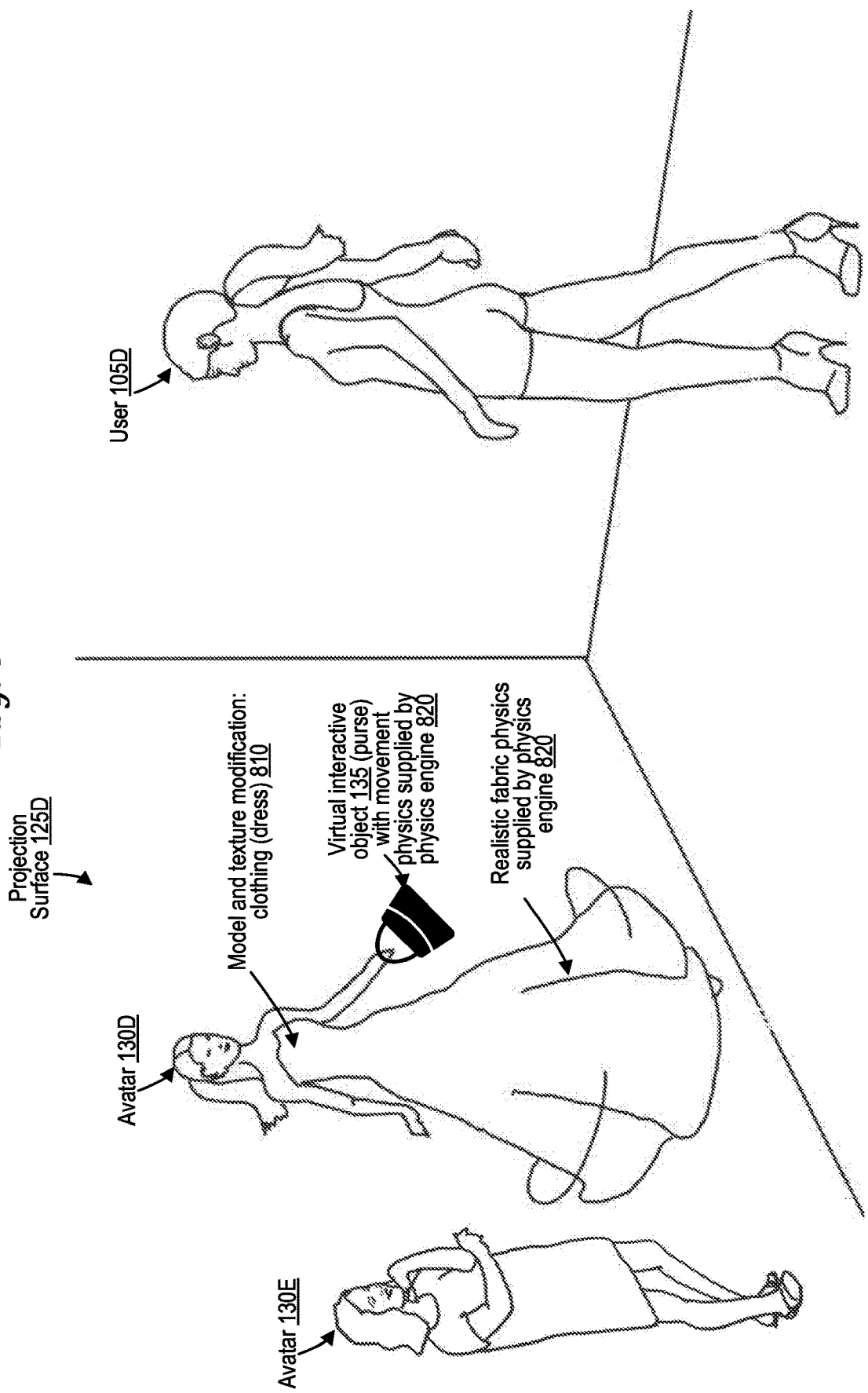
FIG. 8 illustrates a first user interacting with a telepresence scene featuring a first avatar corresponding to the first user but with a modified clothing model and an interactive virtual purse object, and featuring a second avatar representing a second user.

FIG. 8 illustrates a first user interacting with a telepresence scene featuring a first avatar corresponding to the first user but with a modified clothing model and an interactive virtual purse object, and featuring a second avatar representing a second user.

The first user 105D of FIG. 8 is recreated realistically as avatar 130A, but her clothing is modified from a real-world jumper outfit to a virtual wedding dress 810. The virtual wedding dress 810 is illustrated with realistic fabric physics that move realistically based on the movements of the avatar 130D based on the physic engine 820. A virtual interactive "purse" object 135 has also been generated in the hand of the avatar 130D of FIG. 8, which can also move realistically based on the movements of the avatar 130D based on the physics engine 820.

A user interface may allow the user 105D to change outfits worn by the avatar 130D, effectively changing the model and/or texture of the avatar 130D. The user interface may be gesture-based, allowing the user 105D to modify the avatar 130D to wear a different outfit by performing a gesture with her hands, legs, or other part of her body, as described in relation to FIG. 5. For example, a group of outfits may be displayed in the scene of FIG. 8, and the user 105D may point at a particular outfit of the group to modify the avatar 130D to wear that outfit. Alternately, the user 105D may change between outfits using a "swiping" motion. The user interface may be voice-based, allowing the user 105D to modify the avatar 130D to wear a different outfit by issuing a voice command as described in relation to FIG. 5. The user interface may be voice-based, allowing the user 105D to modify the avatar 130D to wear a different outfit by issuing a voice command. The user interface may be time-based, allowing the user 105D to modify the avatar 130D to wear a different outfit on certain holidays, or at a certain time of day, as described in relation to FIG. 5.

In some cases, users can use a 3D scanner to scan personal garments in their wardrobe, such as heirloom items. If the user 105D is holding a device capable of haptic feedback, the user 105D can, in some cases, get tactile impressions of garments through a haptic interface that interacts with the projected image. A second avatar 130E is also pictured in FIG. 8. The second avatar 130B of FIG. 8 is based on a second user 105E (not pictured) who is remote from the first user 105D of FIG. 8.

To avoid confusion, the capture device 110, computing device 115, and projector 120 are not illustrated in FIGS. 8-12, but it should be presumed that they might be somewhere between user(s) 105 and the projection surface(s) 125 of these figures. Furthermore, the virtual space 140 of FIGS. 8-12 is presented as blank for clarity, but it should be understood that the virtual space 140 may be more complex.

Figure 9:
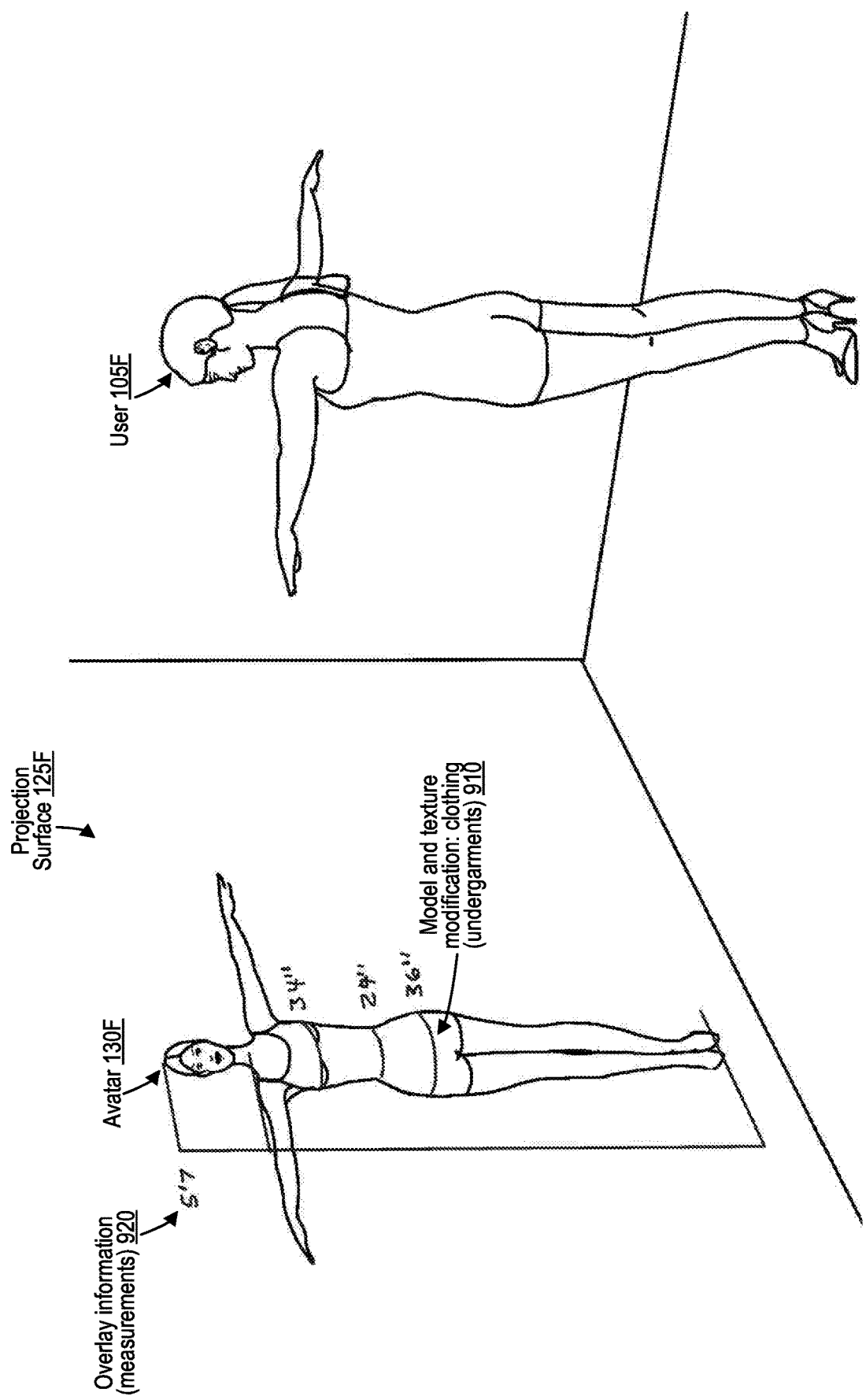
FIG. 9 illustrates a first user interacting with a telepresence scene featuring a first avatar corresponding to the first user but with a modified clothing model and overlaid body measurement data.

FIG. 9 illustrates a first user interacting with a telepresence scene featuring a first avatar corresponding to the first user but with a modified clothing model and overlaid body measurement data.

The first user 105F of FIG. 9 is recreated realistically as avatar 130F, but her clothing is modified from a real-world jumper outfit to virtual undergarments 910. Various overlay information 920 is overlaid over the avatar 130F of FIG. 9, the overlay information 920 identifying measurements of the user 105F as measured by the capture device 110 (not shown).

The telepresence session of FIG. 9 is an example of a "virtual mirror" situation in which a telepresence session may be initiated with only a single user 105F.

Figure 10:
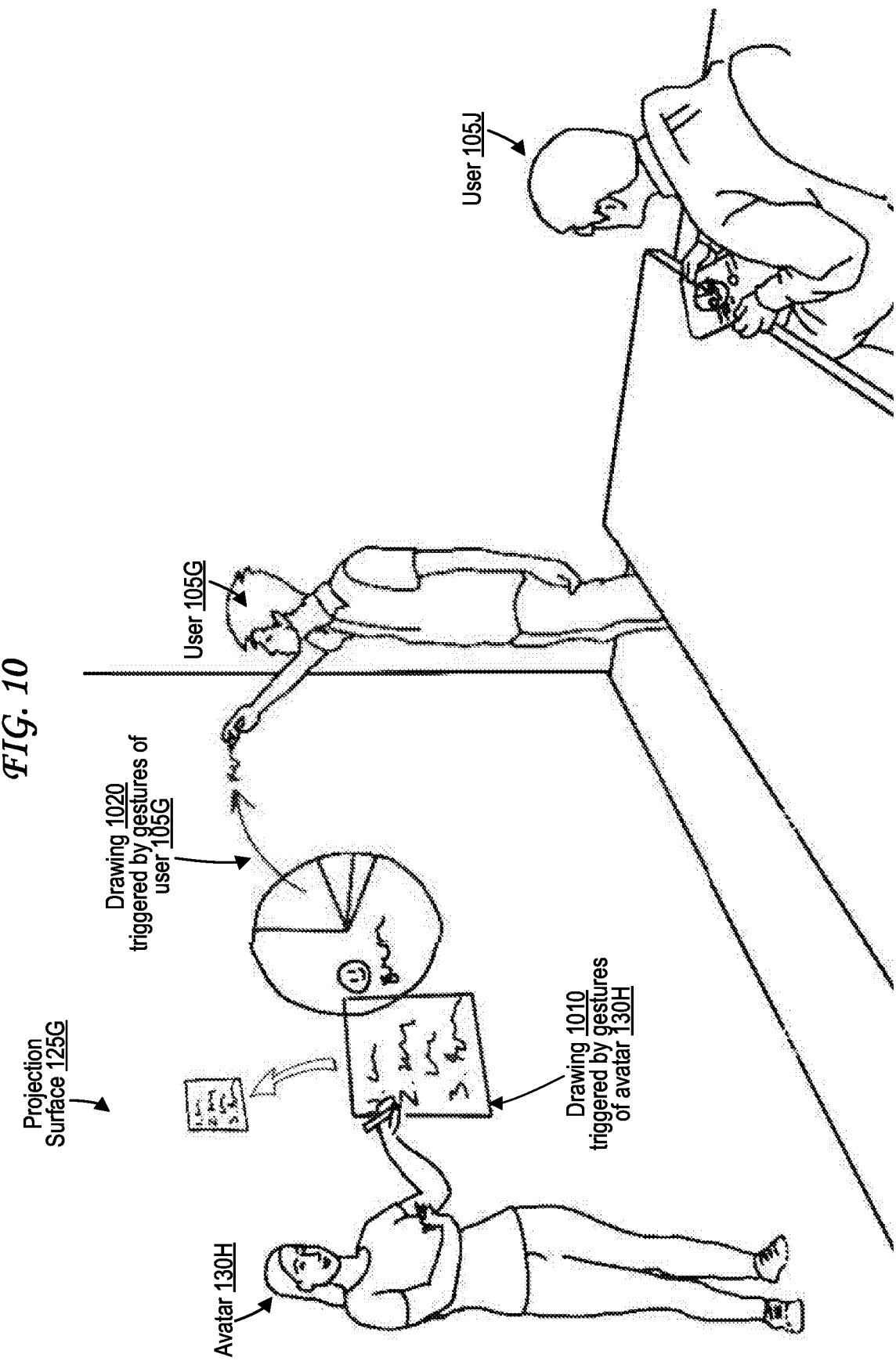
FIG. 10 illustrates a first user and a third user interacting with a telepresence scene featuring a second avatar corresponding to a second user, wherein the first user and the second avatar are drawing within the telepresence scene.

FIG. 10 illustrates a first user and a third user interacting with a telepresence scene featuring a second avatar corresponding to a second user, wherein the first user and the second avatar are drawing within the telepresence scene.

The scenario of FIG. 10 illustrates two users 105G and 105K engaged in a telepresence communication with a third remote user 105H (not pictured), who is represented by her avatar 105H. The scenario of FIG. 10 illustrates user 105G and avatar 130H both interacting with the virtual world 140 of FIG. 8 by drawing on an invisible "whiteboard" plane along the projection surface 125. In particular, user 105G is drawing a drawing 1020, and avatar 130H is drawing a drawing 1010. In some cases, drawings or written commands can perform actions as described in FIG. 5. These may also include having additional computer-generated text or drawings appear such as search engine or map results based on text written by the users, or search engine or map results based on commands spoken by the users.

The telepresence session of FIG. 10 is an example of a situation in which a telepresence session may be initiated where avatars 130 are only created to correspond to a subset of the users—in the case of FIG. 10, only for a user 105H who is remote from the room in which users 105G and 105J are located. Meanwhile, user 105H might see avatars corresponding to users 105G and 105J, but not of herself. In an alternate embodiment (not shown) avatars 130G, 130H, and 130J may all be displayed in the scene of FIG. 10 representing users 105G, 105H, and 105J.

Figure 11:
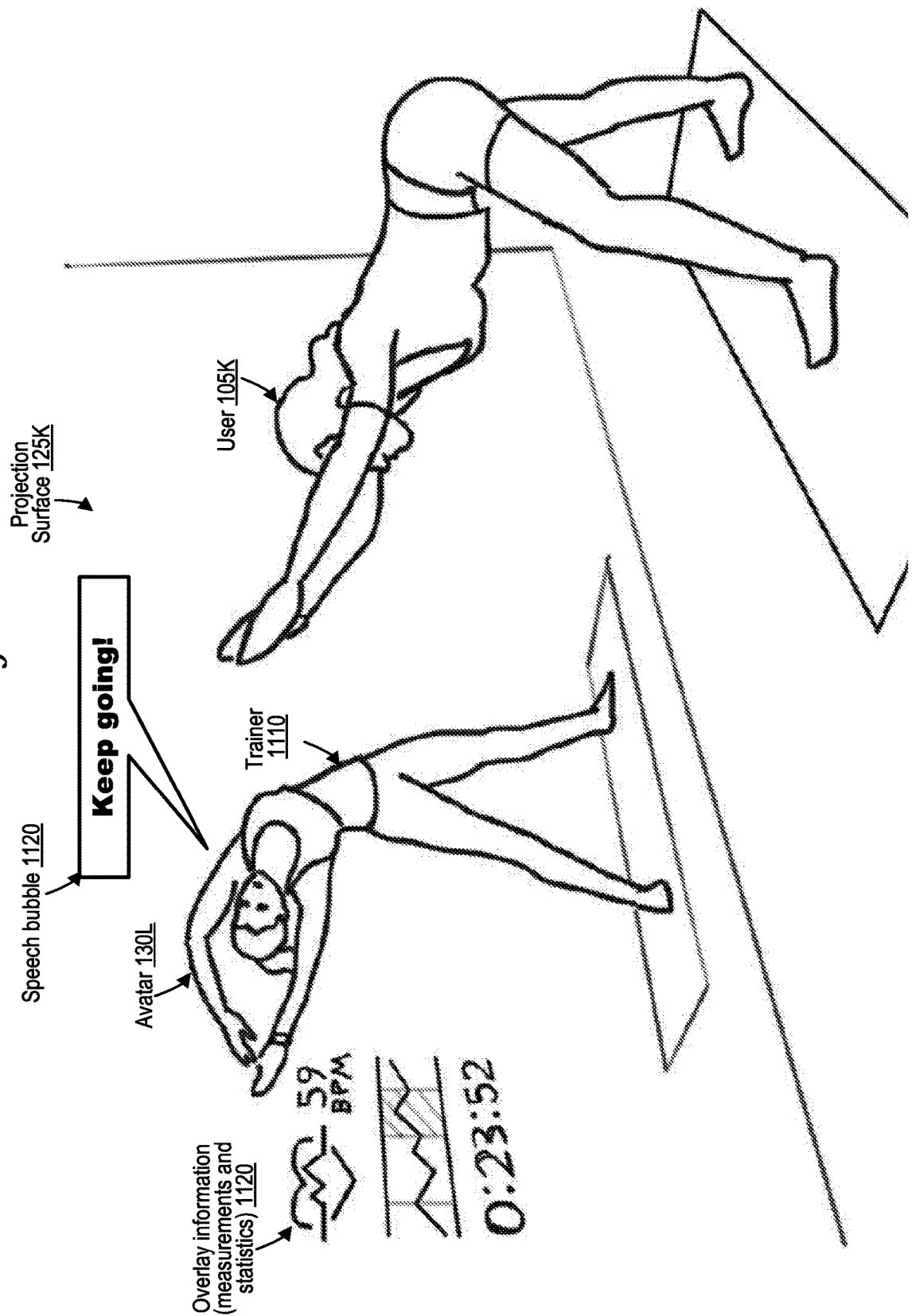
FIG. 11 illustrates a first user interacting with a telepresence scene featuring trainer avatar corresponding to a trainer and overlaid fitness measurement data.

FIG. 11 illustrates a first user interacting with a telepresence scene featuring trainer avatar corresponding to a trainer and overlaid fitness measurement data.

A trainer 1110 located remote from the first user 105K of FIG. 11 is recreated as avatar 130L in FIG. 11. The trainer 1110 can instruct the user 105K what movements to make, and how, via the avatar 130L. Various overlay information 1120 is overlaid over the scene of FIG. 11, the overlay information 1120 identifying fitness measurements and statistics of the user 105K as measured by the capture device 110 and/or other fitness devices (not shown), such as heart rate monitors, blood pressure monitors, or breathing monitors. These measurements and statistics include a timer, a current heart rate in beats per minute, and a graph of the heart rate of the user 105A of FIG. 11 over time.

The scene of FIG. 11 also includes a speech bubble 1120 that illustrates text saying "keep going!" pointing to the avatar 130L that corresponds to the trainer 1110. This illustrates a speech-to-text function performed by a computing device 115K (not pictured) associated with the user 105K, by a computing device 115L (not pictured) associated with the trainer 1110, a remote server 160 (not pictured), or some combination thereof. This can help with accessibility if the user 105K is deaf or hard-of-hearing. This can also help if the user 105K wishes to use the telepresence with a quiet or muted volume setting, or if the user 105K is in a loud environment in which she might not notice speech. The speech-to-text function may in some cases also use machine-translation to automatically translate from one language to another, allowing telepresence communication between users speaking different languages. The automatic machine-translation may also be performed by computing device 115K, computing device 115L, remote server 160, or some combination thereof.

Automatic machine-translation may also be used to output computer-generated speech in a different language from the one originally spoken. For example, if the trainer 1110 of FIG. 11 can say a statement in French. The statement of the trainer may be converted into French text. This French text may then be converted into English text via the automatic machine-translation. The English text may then be converted into computer-generated English speech via a text-to-speech function performed by computing device 115K, computing device 115L, remote server 160, or some combination thereof. This computer-generated English speech may then be output to the user 105K via speakers (not pictured) or headphones (not pictured) communicatively coupled to computing device 115K (not pictured).

While the scene of FIG. 11 does not include an avatar 130K corresponding to the user 105K, other embodiments (not shown) may alternately or additionally include an avatar 130K corresponding to the user 105K, allowing the user 105K to use the projection surface 125K as a "virtual mirror" to visually compare her own movements with those of the trainer 1110.

In some cases, the telepresence scene of FIG. 11 may cause network-connected devices to perform various actions as described in FIG. 5. For example, if the user's heart rate is too high, lights in the environment of the user 105K may flash red, a sound system may play a noise, or an air conditioner or fan may automatically turn on. Lights may also dim and brighten to signify recommended breathing patterns or exercise durations.

In some cases, trainers can provide customized "outlines" so that a user 105 can align their bodies correctly by aligning their avatars 130 to the "outline." This may be useful for teaching a yoga pose, a golf swing, a dance routine, or other trainings that require teaching specific body positions. Various reactions may result, such as any of the actions described in FIG. 5, if the user reaches a correct body position, or an incorrect one.

Figure 12:
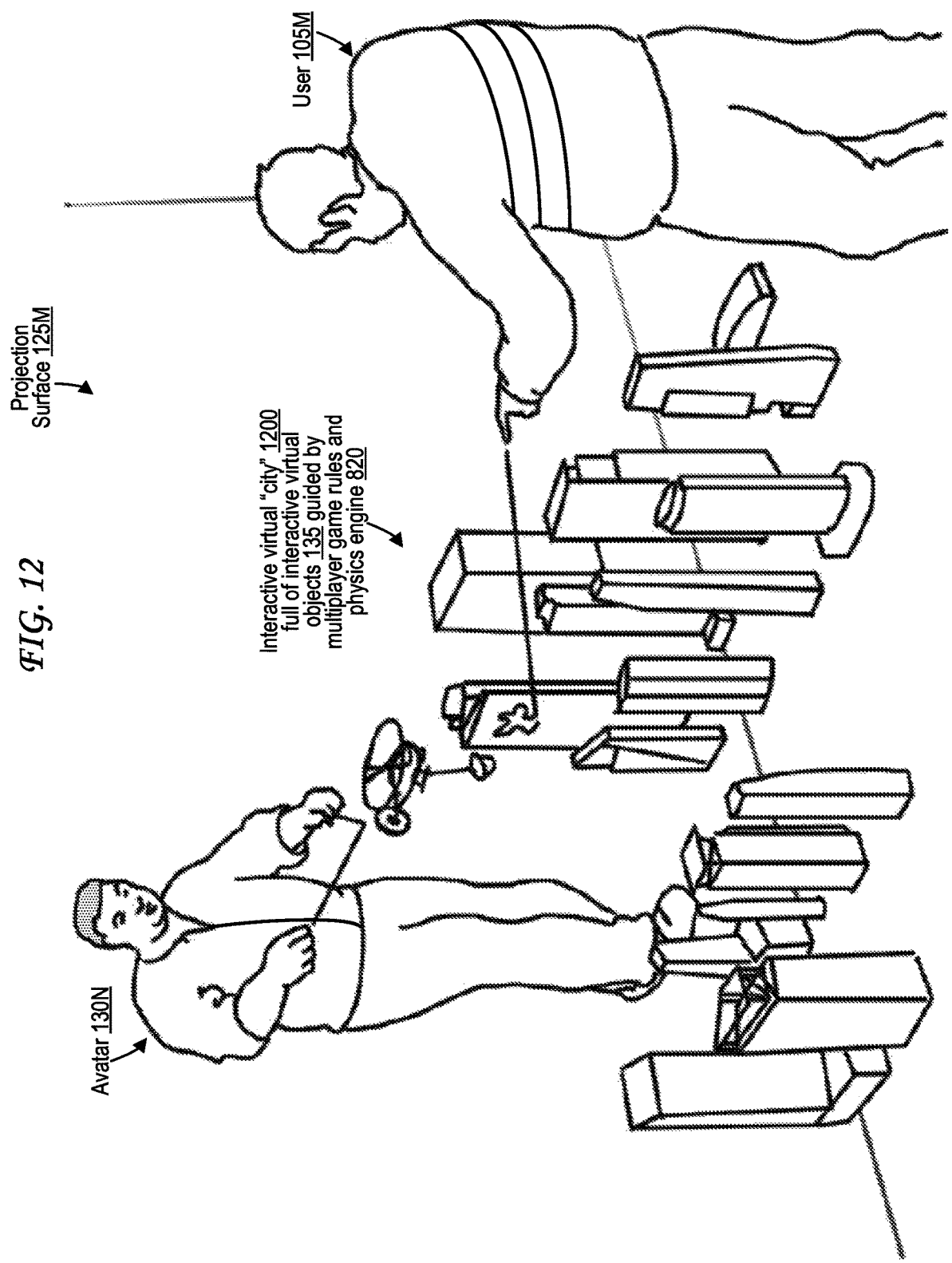
FIG. 12 illustrates a first user interacting with a telepresence scene featuring a second avatar corresponding to a second user with an interactive virtual city multiplayer video game arena.

FIG. 12 illustrates a first user interacting with a telepresence scene featuring a second avatar corresponding to a second user with an interactive virtual city multiplayer video game arena.

A second user 105N (not pictured) remote from the first user 105M of FIG. 12 is recreated realistically as avatar 130N. A large virtual "city" 1200 full of interactive virtual objects 135—buildings and a helicopter—are shown and are guided by a physics engine 820 and by rules of a multiplayer game. Gestures made by the user 105M and avatar 105N can, for example, direct or alter the flight of the interactive virtual helicopter object 135, or can modify various properties of the buildings of the large virtual "city" 1200. Telepresence of avatars 130 in a virtual space 140 may have various uses other than those illustrated in FIG. 1 and FIGS. 8-12. For example, physicians can use this sort of telepresence to help assess or document patient symptoms or recovery, such as to assess recovery of patient mobility via physical therapy. Patients can perform rehabilitation exercises with visual aides at home. Patient progress and activity can be tracked over time, and physicians can perform check-ups remotely.

FIG. 13 illustrates a capture device scanning a user and a projection surface to generate topography and depth data for both.

The projection surface 125 of FIG. 13 is not entirely planar, and is thus mapped out before projection by the capture device 110P, the projector 120P, the computing device 115P (not pictured), or some combination thereof. For example, the projector 120P of FIG. 110 is illustrated projecting a predefined pattern onto the projection surface 125P. The capture device 110P captures the result, and computing device 115P calculates the topography of the projection surface 125P and calculates how it needs to project future scenes to minimize distortion caused by the topography of the projection surface 125P. The computing device 115P and capture device 110P may alternately map out the topography of the projection surface 125P based on depth sensors of the capture device 110, which may include laser rangefinders, sonar sensors, radar sensors, midar sensors, lidar sensors, or some combination thereof. Depth sensors may also include light sources that emit lasers or other types of light and sensors to perform depth imaging via dynamic light/laser scattering (DLS) analysis.

The capture device 110P is also picture capturing visual/depth/motion information about the user 105P of FIG. 13. In some cases, the capture device 110P may perform head tracking, eye tracking, view angle functions, or some combination thereof to identify a user's point of view. A scene projected onto projection surface 125P may then be modified to move the "point of view" of the projected scene via a parallax effect based on a user point of view determined based on a head position of the user 105P, an eye position of the user 105P, a view angle of the user 105P, or some combination thereof. This parallax effect may allow users to view the scene, including its virtual space 140 and any avatar(s) 130 and/or virtual interactive object(s) 135 positioned therein, from a slightly different angle when the user's head moves sideways relative to the capture device 110P, or when the user's eyes shift, or when the user's view angle shifts.

The capture device 110P of FIG. 13 is illustrated capturing visual and/or depth information both toward its "front" side of the capture device 110P, facing the user 105K, and toward its "back" side of the capture device 110P, facing the projection surface 125P. To perform this, the capture device 110P may have at least a subset of the various cameras and/or sensors described above positioned along both the "front" side and the "back" side of the capture device 110P. The capture device 110P may also optionally have the various cameras and/or sensors on other sides besides the "front" and "back" as well, for example to gather spherical visual/depth data around the capture device 110P to adjust display lighting setting based on environmental lighting or room size, or to adjust microphone and/or speaker settings based on the acoustics of a room as determined by shape and structure. Alternately, the capture device 110P of FIG. 13 may include one or more motors, which, when actuated, may rotate the various cameras and/or sensors of the capture device 110P to alternately face the user 105P, the projection surface 125P, and any other directions as needed.

Figure 14:
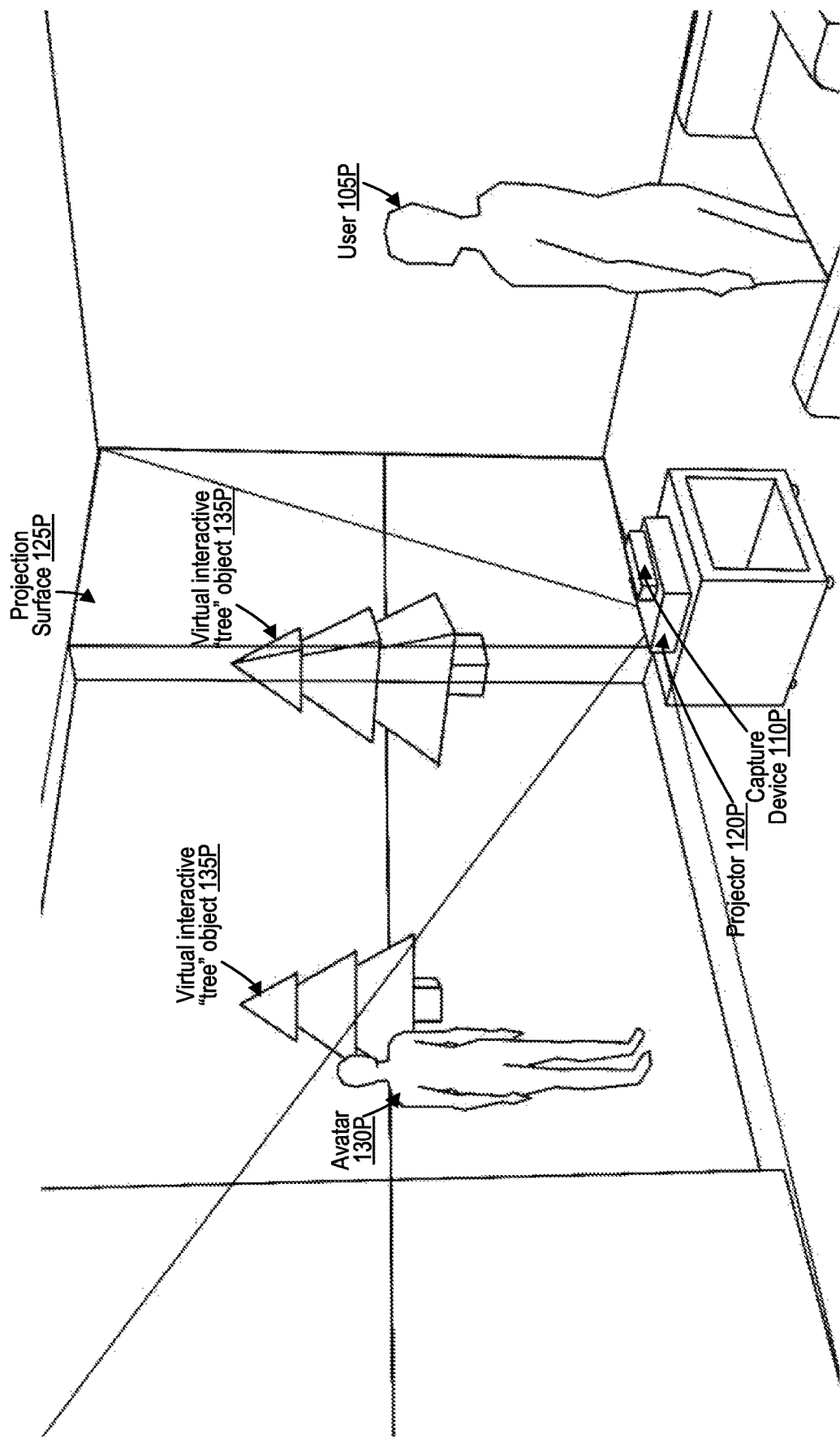
FIG. 14 illustrates a scene projected on the projection surface of FIG. 13, the scene including an avatar corresponding to the user placed into a virtual space.

FIG. 14 illustrates a scene projected on the projection surface of FIG. 13, the scene including an avatar corresponding to the user placed into a virtual space.

The avatar 130 of FIG. 14 corresponds to the user 105 of FIG. 13 and FIG. 14. The avatar 130 of FIG. 14 is placed on a planar ground surface of a generated virtual world 140 of FIG. 14 based on the planar floor that the user 105 is standing on as captured by capture device 110. Several virtual interactive "tree" objects 135 are also placed on the planar ground surface of a generated virtual world 140 of FIG. 14.

Figure 15:
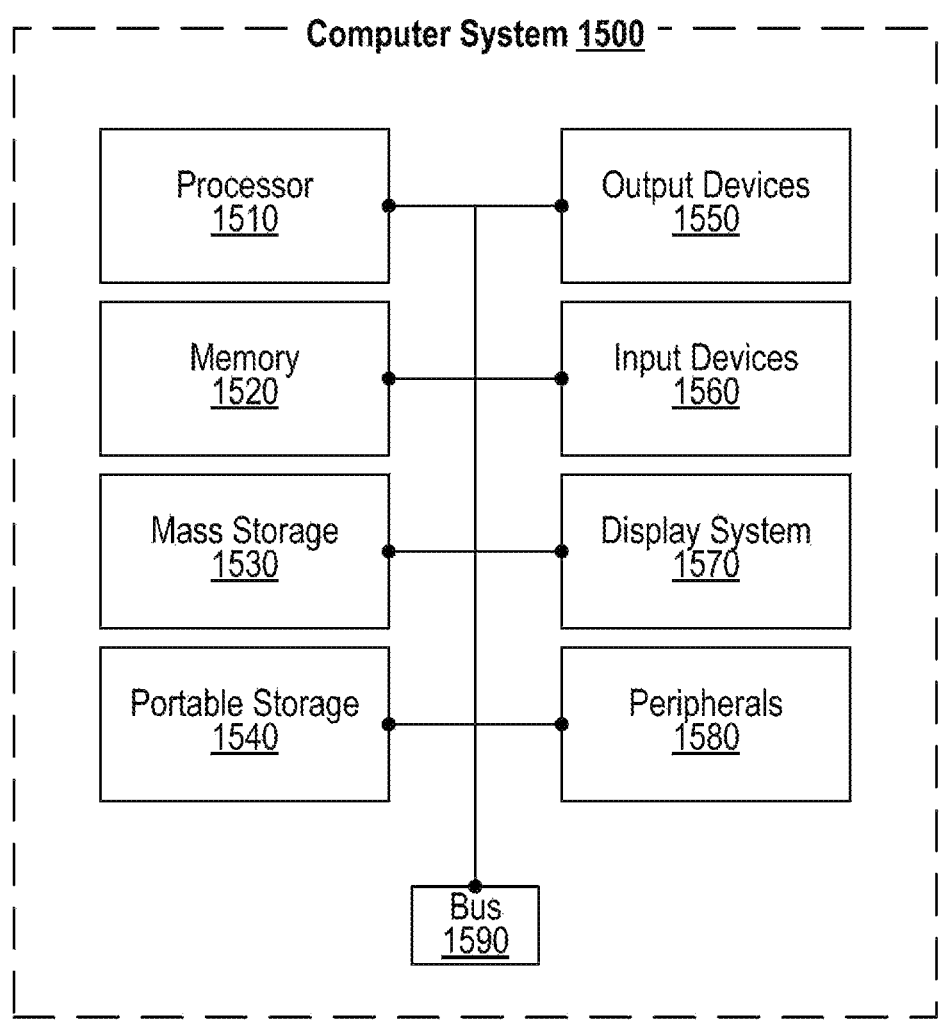
FIG. 15 is a block diagram of an exemplary computing device that may be used to implement an embodiment of the present invention.

FIG. 15 illustrates an exemplary computing system 1500 that may be used to implement an embodiment of the present invention. For example, any of the computer systems or computerized devices described herein may, in at least some cases, include at least one computing system 1500. The computing system 1500 of FIG. 15 includes one or more processors 1510 and memory 1510. Main memory 1510 stores, in part, instructions and data for execution by processor 1510. Main memory 1510 can store the executable code when in operation. The system 1500 of FIG. 15 further includes a mass storage device 1530, portable storage medium drive(s) 1540, output devices 1550, user input devices 1560, a graphics display 1570, and peripheral devices 1580.

The components shown in FIG. 15 are depicted as being connected via a single bus 1590. However, the components may be connected through one or more data transport means. For example, processor unit 1510 and main memory 1510 may be connected via a local microprocessor bus, and the mass storage device 1530, peripheral device(s) 1580, portable storage device 1540, and display system 1570 may be connected via one or more input/output (I/O) buses.

Mass storage device 1530, which may be implemented with a magnetic disk drive or an optical disk drive, is a non-volatile storage device for storing data and instructions for use by processor unit 1510. Mass storage device 1530 can store the system software for implementing embodiments of the present invention for purposes of loading that software into main memory 1510.

Portable storage device 1540 operates in conjunction with a portable non-volatile storage medium, such as a floppy disk, compact disk or Digital video disc, to input and output data and code to and from the computer system 1500 of FIG. 15. The system software for implementing embodiments of the present invention may be stored on such a portable medium and input to the computer system 1500 via the portable storage device 1540.

Input devices 1560 provide a portion of a user interface. Input devices 1560 may include an alpha-numeric keypad, such as a keyboard, for inputting alpha-numeric and other information, or a pointing device, such as a mouse, a trackball, stylus, or cursor direction keys. Additionally, the system 1500 as shown in FIG. 15 includes output devices 1550. Examples of suitable output devices include speakers, printers, network interfaces, and monitors.

Display system 1570 may include a liquid crystal display (LCD), a plasma display, an organic light-emitting diode (OLED) display, an electronic ink display, a projector-based display, a holographic display, or another suitable display device. Display system 1570 receives textual and graphical information, and processes the information for output to the display device. The display system 1570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1580 may include any type of computer support device to add additional functionality to the computer system. For example, peripheral device(s) 1580 may include a modem or a router.

The components contained in the computer system 1500 of FIG. 15 are those typically found in computer systems that may be suitable for use with embodiments of the present invention and are intended to represent a broad category of such computer components that are well known in the art. Thus, the computer system 1500 of FIG. 15 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 1500 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 1500 may be part of a multi-computer system that uses multiple computer systems 1500, each for one or more specific tasks or purposes. For example, the multi-computer system may include multiple computer systems 1500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1500 from different networks communicatively coupled together via the internet (also known as a "distributed" system).

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), blu-ray disk (BDD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for rendering three-dimensional virtual scenes, the method comprising:
   receiving a first visual dataset corresponding to a three-dimensional shape of a first user in a real-world environment, the first visual dataset captured by a first user device;
   rendering a three-dimensional virtual scene that includes a first three-dimensional avatar and one or more virtual objects, the first three-dimensional avatar rendered based on the first visual dataset;
   receiving sensor data including one or more measurements taken by one or more sensors in the real-world environment of the first user;
   identifying a trigger condition when the first three-dimensional avatar is detected interacting with at least one of the virtual objects, wherein identifying the trigger condition includes tracking boundaries of the first three-dimensional avatar and boundaries of the at least one virtual object;
   generating a visual overlay that displays the received measurements, the generated overlay appearing within the three-dimensional virtual scene that is updated based on the identified trigger condition associated with the detected interaction by the first three-dimensional avatar with the at least one virtual object; and
   transmitting the updated three-dimensional virtual scene to a second user device, the transmitted three-dimensional virtual scene including the first three-dimensional avatar interacting with the at least one virtual object and the visual overlay that displays the measurements.

2. The method of claim 1, further comprising:
   storing a plurality of trigger conditions in a trigger database in memory, each trigger condition corresponding to a different action, the plurality of stored trigger conditions including the trigger condition indentified within the three-dimensional virtual scene; and
   initiating the action corresponding to the identified trigger condition, the action initiated to update the three-dimensional scene.

3. The method of claim 2, further comprising storing one or more threshold values in memory, wherein detecting the trigger condition includes comparing the one or more measurements of the first user to the stored threshold values.

4. The method of claim 2, wherein the initiated action includes adjusting operation of a device connected to the first user device.

5. The method of claim 2, wherein the initiated action includes generating an alert associated with the detected trigger condition.

6. The method of claim 5, wherein the alert includes at least one of an audio noise, a visual indicator, and a message.

7. The method of claim 1, wherein the one or more sensors in the real-world environment of the first user include at least one of a heart rate monitor, a blood pressure monitor, a breathing monitor, and a haptic sensor, wherein the one or more measurements include at least one of a heart rate measurement, a blood pressure measurement, a breathing measurement, and a haptic measurement.

8. The method of claim 2, further comprising recognizing that the one or more measurements correspond to a gesture by the first user, wherein detecting the trigger condition is based on the recognized gesture.

9. The method of claim 1, wherein the visual overlay includes a virtual object that corresponds to the received measurements.

10. The method of claim 1, wherein the visual overlay includes a speech bubble that includes text corresponding to one or more spoken words associated with the three-dimensional virtual scene.

11. The method of claim 10, further comprising detecting that at least one of the spoken words is in a different language than a predetermined language associated with the three-dimensional virtual scene, and translating the at least one spoken word to generate the text within the speech bubble.

12. The method of claim 2, wherein the visual overlay includes a customized outline that corresponds to the first three-dimensional avatar, the detected trigger condition including an alignment of the first three-dimensional avatar to the customized outline, and wherein the initiated action is based on the alignment.

13. The method of claim 12, further comprising receiving a second visual dataset from the second user device, and generating a second three-dimensional avatar based on the second visual dataset, wherein the visual overlay further includes a different customized outline corresponding to the second three-dimensional avatar.

14. The method of claim 12, further comprising mapping a topography of the real-world environment based on one or more depth measurements in the first visual dataset.

15. The method of claim 1, further comprising generating a display of the three-dimensional virtual scene for the first user device, wherein the display generated for the first user device is different than a display of the three-dimensional virtual scene that is generated for the second user device.

16. The method of claim 2, wherein the initiated action includes generating haptic feedback via a haptic interface associated with the first user device.

17. A system for rendering three-dimensional virtual scenes, the system comprising:
   a communication interface that communicates with a first user device over a communication network to:
      receive a first visual dataset corresponding to a three-dimensional shape of a first user in a real-world environment, the first visual dataset captured by the first user device; and
      receive sensor data including one or more measurements taken by one or more sensors in the real-world environment; and
   a processor coupled to memory storing instructions, wherein the processor executes the instructions stored in memory to:
      render a three-dimensional virtual scene that includes a first three-dimensional avatar and one or more virtual objects, the first three-dimensional avatar rendered based on the first visual dataset;

identify a trigger condition when the first three-dimensional avatar is detected interacting with at least one of the virtual objects, wherein identifying the trigger condition includes tracking boundaries of the first three-dimensional avatar and boundaries of the at least one virtual object; and generate a visual overlay that displays the received measurements, the generated overlay appearing within the three-dimensional virtual scene that is updated based on the iidentified trigger condition associated with the detected interaction by the first three-dimensional avatar with the at least one virtual object, wherein communication interface transmits the updated three-dimensional virtual scene to a second user device, the transmitted three-dimensional virtual scene including the first three-dimensional avatar interacting with the at least one virtual object and the visual overlay that displays the measurements.

18. The system of claim 17, further comprising memory that stores a plurality of trigger conditions in a trigger database, each trigger condition corresponding to a different action, the plurality of stored trigger conditions including the trigger condition identified within the three-dimensional virtual scene; and wherein the processor executes further instructions to:

initiate the action corresponding to the identified trigger condition, the action initiated to update the three-dimensional scene.

19. A non-transitory computer-readable storage medium, having embodied thereon a program executable by a processor to perform a method for rendering three-dimensional virtual scenes, the method comprising:

receiving a first visual dataset corresponding to a three-dimensional shape of a first user in a real-world environment, the first visual dataset captured by a first user device;

rendering a three-dimensional virtual scene that includes a first three-dimensional avatar and one or more virtual objects, the first three-dimensional avatar rendered based on the first visual dataset;

receiving sensor data including one or more measurements taken by one or more sensors in the real-world environment of the first user;

identifying a trigger condition when the first three-dimensional avatar is detected interacting with at least one of the virtual objects, wherein identifying the trigger condition includes tracking boundaries of the first three-dimensional avatar and boundaries of the at least one virtual object;

generating a visual overlay that displays the received measurements, the generated overlay appearing within the three-dimensional virtual scene that is updated based on the identified trigger condition associated with the detected interaction by the first three-dimensional avatar with the at least one virtual object; and transmitting the updated three-dimensional virtual scene to a second user device, the transmitted three-dimensional virtual scene including the first three-dimensional avatar interacting with the at least one virtual object and the visual overlay that displays the measurements.

* * * * *